United States Patent
Shan et al.

(10) Patent No.: US 9,638,528 B2
(45) Date of Patent: May 2, 2017

(54) METHOD AND APPARATUS FOR DISPLAYING GEOGRAPHIC LOCATION

(71) Applicant: Tencent Technology (Shenzhen) Company Limited, Shenzhen, Guangdong (CN)

(72) Inventors: Yi Shan, Guangdong (CN); Pinlin Chen, Guangdong (CN); Dacheng Zhuo, Guangdong (CN); Liang Wu, Guangdong (CN); Ling Li, Guangdong (CN); Jun Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/600,987

(22) Filed: Jan. 20, 2015

(65) Prior Publication Data
US 2015/0134235 A1 May 14, 2015

Related U.S. Application Data

(63) Continuation of application No. PCT/CN2014/077857, filed on May 20, 2014.

(30) Foreign Application Priority Data

Sep. 29, 2013 (CN) .......................... 2013 1 0461634

(51) Int. Cl.
*G01C 21/00* (2006.01)
*G01C 21/26* (2006.01)
(Continued)

(52) U.S. Cl.
CPC ....... *G01C 21/26* (2013.01); *G06F 17/30241* (2013.01); *G01C 21/3679* (2013.01)

(58) Field of Classification Search
CPC .. G01C 21/34; G01C 21/3476; G01C 21/362; G01C 21/26; G01C 21/3679; G06F 17/30241
USPC .......................................... 701/409; 455/466
See application file for complete search history.

(56) References Cited

U.S. PATENT DOCUMENTS

| | | | | |
|---|---|---|---|---|
| 7,082,365 B2* | 7/2006 | Sheha | ............... | G01C 21/3679 340/990 |
| 7,155,339 B2* | 12/2006 | Tu | .................... | G01C 21/3679 340/995.1 |

(Continued)

FOREIGN PATENT DOCUMENTS

| | | |
|---|---|---|
| CN | 101514905 A | 8/2009 |
| CN | 101726305 A | 6/2010 |

(Continued)

OTHER PUBLICATIONS

International Search Report issued Sep. 4, 2014 in International Application No. PCT/CN2014/077857.

*Primary Examiner* — Isaac Smith
(74) *Attorney, Agent, or Firm* — Brinks Gilson & Lione

(57) ABSTRACT

The present disclosure relates to a method and an apparatus for displaying a geographic location. The method comprises providing a terminal device to a user, wherein the terminal device includes a processor and a screen. Through a processor of the terminal device, the method comprises receiving a positioning instruction from the user; acquiring a first location based on the positioning instruction; acquiring information of at least one point of interest (POI) associated with the first location; displaying the first location on a map displayed in a first display area on the screen; and displaying a first POI list in a second display area on the screen, wherein the first POI list includes at least one entry being (Continued)

displayed in a first order, each entry includes the information of a POI in the at least one POI.

20 Claims, 33 Drawing Sheets

(51) Int. Cl.
    *G06F 17/30*     (2006.01)
    *G01C 21/36*     (2006.01)

(56) References Cited

U.S. PATENT DOCUMENTS

| | | | |
|---|---|---|---|
| 7,271,742 B2 * | 9/2007 | Sheha | G06F 3/0484 |
| | | | 340/995.19 |
| 2008/0182598 A1 * | 7/2008 | Bowman | G01C 21/26 |
| | | | 455/466 |
| 2009/0088964 A1 | 4/2009 | Schaaf et al. | |
| 2011/0166777 A1 | 7/2011 | Chavakula | |
| 2011/0238301 A1 * | 9/2011 | Lee | G01C 21/20 |
| | | | 701/408 |
| 2011/0275415 A1 * | 11/2011 | Lee | G06F 1/1686 |
| | | | 455/566 |
| 2014/0358438 A1 * | 12/2014 | Cerny | G01C 21/00 |
| | | | 701/537 |

FOREIGN PATENT DOCUMENTS

| | | |
|---|---|---|
| CN | 101995258 B | 3/2011 |
| CN | 102208153 A | 10/2011 |
| CN | 102355624 A | 2/2012 |
| CN | 102694829 A | 9/2012 |
| CN | 102737047 A | 10/2012 |
| CN | 102829792 A | 12/2012 |
| JP | 2012145432 A | 8/2012 |

* cited by examiner

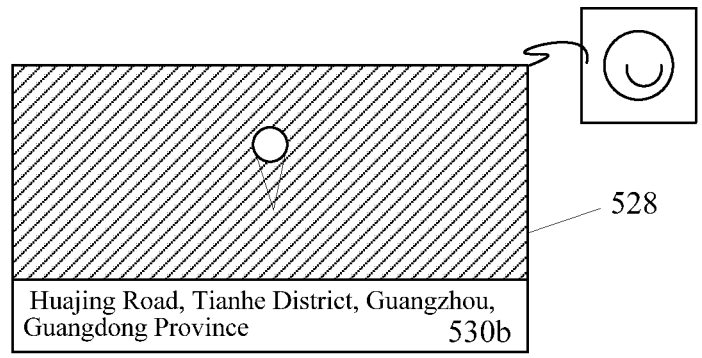
(1) Display address information only
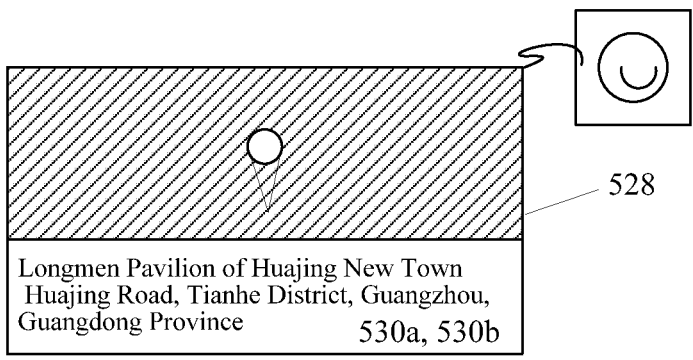
(2) Display a POI title and address information
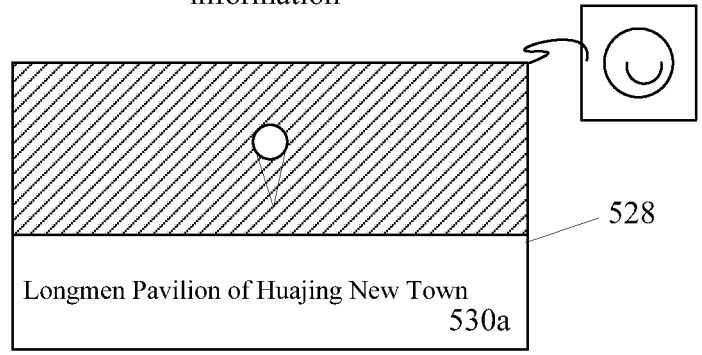
(3) Display a POI title only
FIG. 13

| Huajing Road, Tianhe District, Guangzhou, Guangdong Province |
(1) Display address
information only
| Longmen Pavilion of Huajing New Town Huajing Road, Tianhe District, Guangzhou, Guangdong Province |
(2) Display a POI title and
address information
| Longmen Pavilion of Huajing New Town |
(3) Display a POI title only
FIG. 14

| | |
|---|---|
| 2920 — | Baiyun Mountain ⬚ Cancel |
| | 2900 |
| 2901 — | Baiyun Mountain<br>Baiyun District, Guangzhou, Guangdong Province |
| 2902 — | Baiyun Mountain<br>Lianquan Road, Tianhe District, Guangzhou, Guangdong Province |
| 2903 — | Baiyun Mountain Scenic Area<br>Baiyun Avenue South Road, Baiyun District, Guangzhou, Guangdong Province |
| 2904 — | Baiyun Mountain<br>No. 389 North Shatai Road, Baiyun District, Guangzhou, Guangdong Province |
| 2905 — | Baiyunshan Police Station<br>Baiyun Mountain Scenic Area, South Yunshan Road, Baiyun District, Guangzhou, Guangdong Province |
| 2906 — | Yunxi Park<br>Baiyun District, Guangzhou, Guangdong Province |
| 2907 — | Greenery Café<br>…Baiyun Mountain Scenic Area, South Yunshan Road, Baiyun District, Guangzhou, Guangdong Province |
| 2908 — | Baiyunshan Cableway<br>South Yunshan Road, Tianhe District, Guangzhou, Guangdong Province |
| 2909 — | Baiyunshan Road<br>Yuexiu District, Guangzhou, Guangdong Province |
| 2910 — | Baiyunshan Farm<br>Baiyun District, Guangzhou, Guangdong Province |

2922 — Information displayed is not complete

FIG. 29

METHOD AND APPARATUS FOR DISPLAYING GEOGRAPHIC LOCATION

PRIORITY STATEMENT

This application is a continuation of International Application No. PCT/CN2014/077857, filed on May 20, 2014, in the State Intellectual Property Office of the People's Republic of China, which claims the priority benefit of Chinese Patent Application No. 201310461634.2 filed on Sep. 29, 2013, the disclosures of which are incorporated herein in their entirety by reference

TECHNICAL FIELD

The present disclosure relates to the field of network technologies. Specifically, the present disclosure relates to a method and an apparatus for displaying a geographic location.

BACKGROUND

With the development of network technologies, people may perform positioning at any time by using devices with a positioning function to obtain their geographic locations, or search for point of interest (POI) information near a certain location. As a most commonly used communication tool, instant messaging applications also have a function of bookmarking (i.e., bookmarking or saving) geographic locations.

At present, when an instant messaging application bookmarks a geographic location, positioning may be performed automatically and a current location of the user may be displayed on the map, and if a location that the user wants to bookmark may be not the current location, the user may drag the map with a hand the location that the user wants to bookmark.

However, when a location that the user wants to bookmark may be displayed on a map, current applications only display the address, such as longitude and latitude or a street name, of the location. The user cannot obtain key information of the address, such as a name of a certain business building or a name of a certain restaurant on or near the location. Therefore, it may be inconvenient for the user to recognize and search for the location, and the user cannot search for POIs near the location, or obtain information such as a surrounding environment.

SUMMARY

According to an aspect of the present disclosure, a method for displaying a geographic location may comprise providing a terminal device to a user, wherein the terminal device includes a processor and a screen. Through a processor of the terminal device, the method may further comprise receiving a positioning instruction from the user; acquiring a first location based on the positioning instruction; acquiring information of at least one point of interest (POI) associated with the first location; displaying the first location on a map displayed in a first display area on the screen; and displaying a first POI list in a second display area on the screen, wherein the first POI list includes at least one entry being displayed in a first order, each entry includes the information of a POI in the at least one POI.

According to another aspect of the present disclosure, an apparatus may comprise a processor-readable non-transitory storage medium and a processor in communication with the storage medium. The processor may be configured to execute the set of instructions to: receive a positioning instruction from the user; acquire a first location based on the positioning instruction; acquire information of at least one POI associated with the first location; display the first location on a map displayed in a first display area on the screen; and display a first POI list in a second display area on the screen, wherein the first POI list includes at least one entry being displayed in a first order, each entry includes the information of a POI in the at least one POI.

BRIEF DESCRIPTION OF THE DRAWINGS

The above and other features and advantages will become more apparent by describing in detail example embodiments thereof with reference to the attached drawings in which:

FIGS. 3-15 is schematic views of an interface in a method for displaying a geographic location provided by an example embodiment of the present disclosure;

FIGS. 27-31 is schematic views of a display interface in a method for displaying a geographic location provided by an example embodiment of the present disclosure;

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter may be intended to be construed as not being limited to any example embodiments set forth herein; example embodiments may be provided merely to be illustrative. Likewise, a reasonably broad scope for claimed or covered subject matter may be intended. Among other things, for example, subject matter may be embodied as methods, devices, components, or systems. The following detailed description is, therefore, not intended to be limiting on the scope of what may be claimed.

Throughout the specification and claims, terms may have nuanced meanings suggested or implied in context beyond an explicitly stated meaning. Likewise, the phrase "in one example embodiment" as used herein does not necessarily refer to the same embodiment and the phrase "in another example embodiment" as used herein does not necessarily refer to a different embodiment. It may be intended, for example, that claimed subject matter may include combinations of example embodiments in whole or in part.

In general, terminology may be understood at least in part from usage in context. For example, terms, such as "and", "or", or "and/or," as used herein may include a variety of meanings that may depend at least in part upon the context in which such terms may be used. Typically, "or" if used to associate a list, such as A, B or C, may be intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 35:
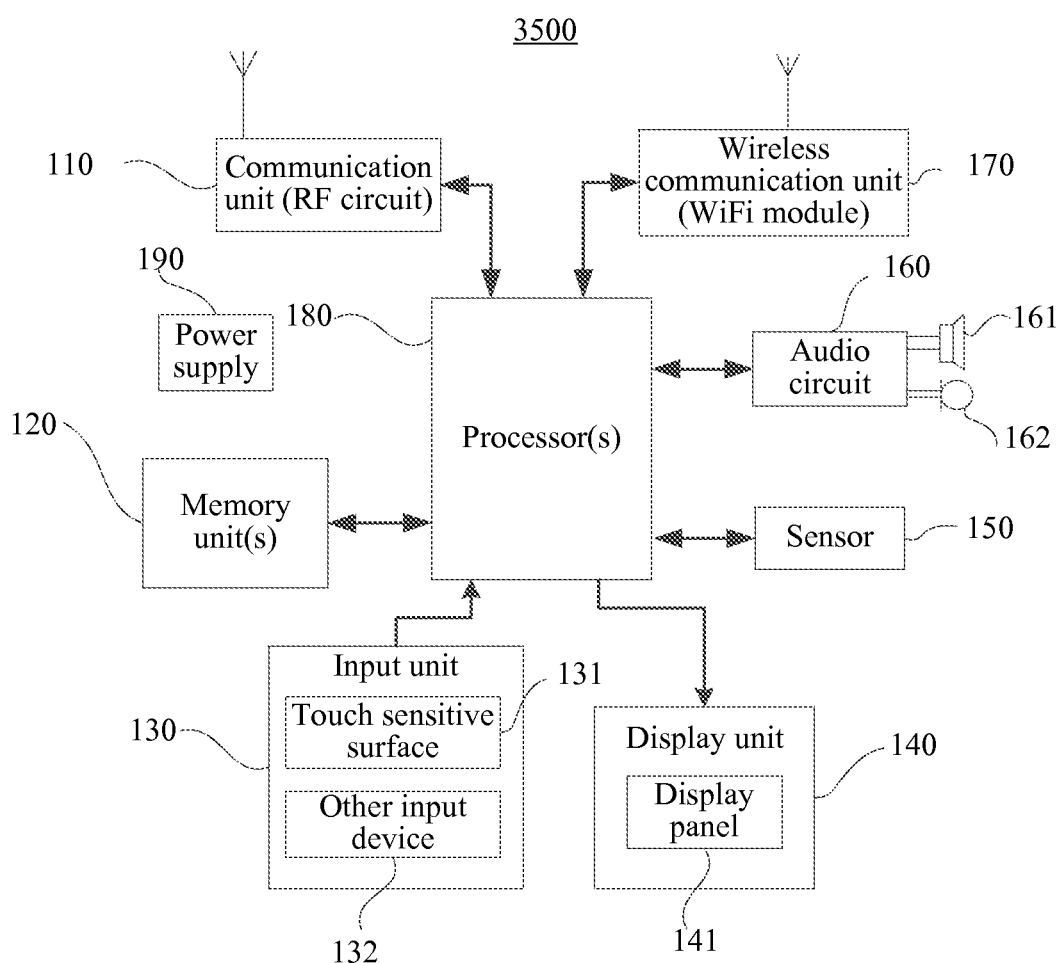
FIG. 35 is a schematic structure diagram of a terminal involved in an example embodiment of the present disclosure.

FIG. 35 is a schematic structural diagram of a terminal provided by an embodiment of the present disclosure. The may be implemented as systems and/or to operate methods disclosed in the present disclosure.

The terminal 3500 may include an RF (Radio Frequency) circuit 110, one or more than one memory unit(s) 120 of computer-readable non-transitory memory media, an input unit 130, a display unit 140, a sensor 150, an audio circuit 160, a wireless communication module (e.g., WiFi (wireless fidelity) module) 170, at least one processor 180, and a power supply 190. Those of ordinary skill in the art may understand that the structure of the terminal 3500 shown in FIG. 35 does not constitute restrictions on the terminal 3500. Compared with what may be shown in the figure, more or fewer components may be included, or certain components may be combined, or components may be arranged differently.

The communication unit (e.g., RF circuit) 110 may be configured to receive and transmit signals during the course of receiving and transmitting information and/or phone conversation. Specifically, after the RF circuit 110 receives downlink information from a base station, it may hand off the downlink information to the processor 180 for processing. Additionally, the RF circuit 110 may transmit uplink data to the base station. Generally, the RF circuit 110 may include, but may be not limited to, an antenna, at least one amplifier, a tuner, one or multiple oscillators, a subscriber identification module (SIM) card, a transceiver, a coupler, an LNA (Low Noise Amplifier), and a duplexer. The RF circuit 110 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 120 may be configured to store software programs and/or modules. The software programs and/or modules may be sets of instructions to be executed by the processor 180. The processor 180 may execute various functional applications and data processing by running the software programs and modules stored in the memory unit 120. The memory unit 120 may include a program memory area and a data memory area, wherein the program memory area may store the operating system and at least one functionally required application program (such as the audio playback function and image playback function); the data memory area may store data (such as audio data and phone book) created according to the use of the terminal 3500. Moreover, the memory unit 120 may include high-speed random-access memory and may further include non-volatile memory, such as at least one disk memory device, flash device, or other volatile solid-state memory devices. Accordingly, the memory unit 120 may further include a memory controller to provide the processor 180 and the input unit 130 with access to the memory unit 120.

The input unit 130 may be configured to receive information, such as numbers or characters, and create input of signals from keyboards, touch screens, mice, joysticks, optical or track balls, which may be related to user configuration and function control. Specifically, the input unit 130 may include a touch-sensitive surface 131 and other input devices 132. The touch-sensitive surface 131, also called a touch screen or a touch pad, may collect touch operations by a user on or close to it (e.g., touch operations on the touch-sensitive surface 131 or close to the touch-sensitive surface 131 by the user using a finger, a stylus, and/or any other appropriate object or attachment) and drive corresponding connecting devices according to preset programs. The touch-sensitive surface 131 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen may be contacted, and then send the touch point coordinates information to the processor 180. The touch controller may also receive commands sent by the processor 180 for execution. Moreover, the touch-sensitive surface 131 may be realized by adopting multiple types of touch-sensitive surfaces, such as resistive, capacitive, infrared, and/or surface acoustic sound wave surfaces. Besides the touch-sensitive surface 131, the input unit 130 may further include other input devices 132, such as the input devices 132 may also include, but not limited to, one or multiple types of physical keyboards, functional keys (for example, volume control buttons and switch buttons), trackballs, mice, and/or joysticks.

The display unit 140 may be configured to display information input by the user, provided to the user, and various graphical user interfaces on the terminal 3500. These graphical user interfaces may be composed of graphics, texts, icons, videos, and/or combinations thereof. The display unit 140 may include a display panel 141. The display panel 141 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 131 may cover the display panel 141. After the touch-sensitive surface 131 detects touch operations on it or nearby, it may transmit signals of the touch operations to the processor 180 to determine the type of the touch event. Afterwards, according to the type of the touch event, the processor 180 may provide corresponding visual output on the display panel 141. In FIG. 35, the touch-sensitive surface 131 and the display panel 141 realize the input and output functions as two independent components. Alternatively, the touch-sensitive surface 131 and the display panel 141 may be integrated to realize the input and output functions.

The terminal 3500 may further include at least one type of sensor 150, for example, an optical sensor, a motion sensor, and other sensors. An optical sensor may include an environmental optical sensor and a proximity sensor, wherein the environmental optical sensor may adjust the brightness of the display panel 141 according to the brightness of the environment, and the proximity sensor may turn off the display panel 141 and/or back light when the terminal 3500 may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the terminal 3500 (e.g., switching screen orientation, related games, and magnetometer calibration) and functions related to vibration recognition (e.g., pedometers and tapping); the terminal 3500 may also be configured with a gyroscope, barometer, hygrometer, thermometer, infrared sensor, and other sensors.

An audio circuit 160, a speaker 161, and a microphone 162 may provide audio interfaces between the user and the terminal 3500. The audio circuit 160 may transmit the electric signals, which may be converted from the received audio data, to the speaker 161, and the speaker 161 may convert them into the output of sound signals; on the other hand, the microphone 162 may convert the collected sound signals into electric signals, which may be converted into audio data after they may be received by the audio circuit 160; after the audio data may be output to the processor 180 for processing, it may be transmitted via the RF circuit 110 to, for example, another terminal; or the audio data may be output to the memory unit 120 for further processing. The audio circuit 160 may further include an earplug jack to provide communication between earplugs and the terminal 3500.

WiFi may be a short-distance wireless transmission technology. Via the WiFi module 170, the terminal 3500 may help users receive and send emails, browse web pages, and visit streaming media. The WiFi module 170 may provide the user with wireless broadband Internet access.

The processor 180 may be the control center of the terminal 3500. The processor 180 may connect to various parts of the entire terminal 3500 utilizing various interfaces and circuits. The processor 180 may conduct overall monitoring of the terminal 3500 by running or executing the software programs and/or modules stored in the memory unit 120, calling the data stored in the memory unit 120, and executing various functions and processing data of the terminal 3500. The processor 180 may include one or multiple processing core(s). The processor 180 may integrate an application processor and a modem processor, wherein the application processor may process the operating system, user interface, and application programs, and the modem processor may process wireless communication.

The terminal 3500 may further include a power supply 190 (for example a battery), which supplies power to various components. The power supply may be logically connected to the processor 180 via a power management system so that charging, discharging, power consumption management, and other functions may be realized via the power management system. The power supply 190 may further include one or more than one DC or AC power supply, a recharging system, a power failure detection circuit, a power converter or inverter, a power status indicator, and other random components.

Further, the terminal 3500 may also include a camera, Bluetooth module, etc., which may be not shown in FIG. 35. The display unit of the terminal may be a touch screen display, and the terminal may further include a memory, and one or more programs, where the one or more programs may be stored in the memory.

Merely for illustration, only one processor will be described in client devices that execute operations and/or method steps in the following example embodiments. However, it should be note that the client devices in the present disclosure may also include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 1:
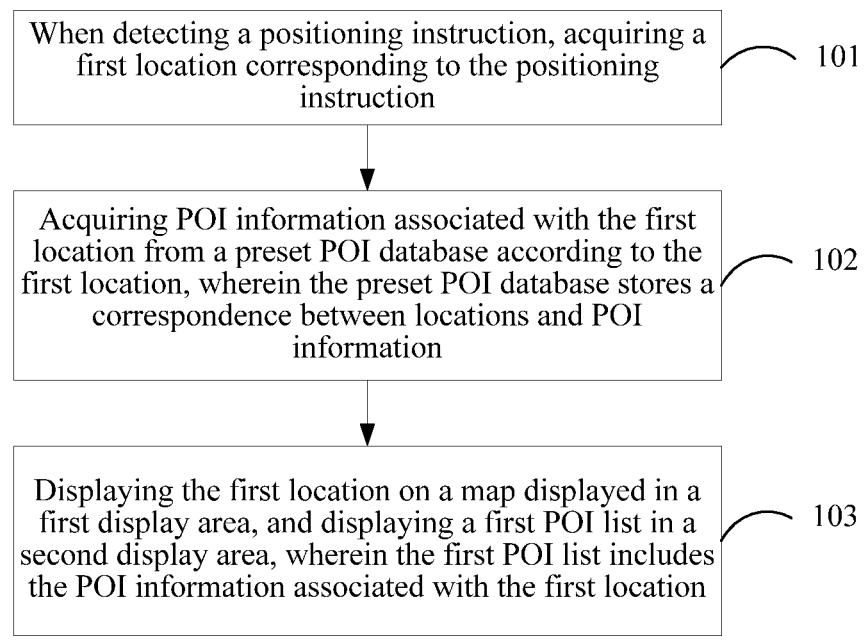
FIG. 1 is a flowchart of a method for displaying a geographic location provided by an example embodiment of the present disclosure.

FIG. 1 may be a flowchart of a method for displaying a geographic location provided by an embodiment of the present disclosure. The method may be stored in the memory unit 120 of the terminal 3500 as a set of instructions and executed by the processor 180 of the terminal 3500 in FIG. 35. The set of instructions may direct the processor 180 to perform the following steps of the method:

101: When detecting a positioning instruction, acquiring a first location corresponding to the positioning instruction.

102: Acquiring POI information associated with the first location from a preset POI database according to the first location, where the preset POI database stores correspondences between locations and POI information.

103: Displaying the first location on a map displayed in a first display area (e.g., an upper portion of a screen of the terminal 3500), and displaying a first POI list in a second display area (e.g., a lower portion of the screen of the terminal 3500), wherein the first POI list may include the POI information associated with the first location.

In the method provided by the example embodiment of the present disclosure, the user may locate in a first location, where information of a POI nearby may be a true location that the user wishes to bookmark or send to a friend. To this end, the user may turn on a map application in his/her terminal (e.g., a smart phone). The map application may display the first location where the user locates and a map of a surrounding area of the first location. The user may select the first location displayed on the map. Upon receiving the selection, the terminal may display for the user, together with the map around the first location, a list of POI (i.e., a first POI list) around the first location. Thus, information displayed for the user may include not only the position for the address of the first location but also the first location and POI information around. This makes it convenient for the user to perform searching according to the POI information and obtain a surrounding environment of the first location. By selecting information of a POI in the POI list, the user may directly position on the map to a second location corresponding to the selected POI information. Accordingly, the terminal may display the second location, the map around the second location, and a new list of POI (i.e., a second POI list) around the second location. The user may manage the second location, for example, check, send, and bookmark the second location, thereby implementing a more precise and refined positioning operation. This is more convenient and efficient for the user to manage the location.

Additionally, after the step of displaying the first POI list in first order in a second display area, where the first POI list may include the POI information associated with the first location, the method may further include: when detecting a selection operation on any piece of POI information in the first POI list, acquiring a second location from the POI information corresponding to the selection operation, where the second location may be a geographic location of the POI information corresponding to the selection operation; displaying the second location on the map displayed in the first display area (e.g., displaying a map centered by the second location); and displaying the first POI list in second order in the second display area.

In the first order, the POI in the first POI list may be listed based on an ascending order of distances to the first location, i.e., listing a POI with the shortest distance to the first location as the first item in the list, and listing a POI with the longest distance to the first location as the last item in the list. In the second order, the POI information entry corresponding to the second location may be listed as a first item, and starting from a second item, the remaining entries in the first POI list may be displayed in first order.

The method may further include: managing POI information of the second location according to a management operation on the second location. The management operation may be a bookmarking operation, a sending operation, an editing operation, a publishing operation, and/or a sharing operation.

When the terminal detects that the operation is the bookmarking operation on the second location, the terminal may bookmark the POI information of the second location.

When the terminal detects that the operation is the sending operation on the second location, the terminal may send the POI information of the second location to a receiver specified by the sending operation. The POI information received by the receiver (e.g., a terminal such as the terminal 3500) may generate an interactive object (e.g., a popup interface mapping to the second location and showing the POI information of the second location), so that the receiver may check the second location according to the interactive object.

When the terminal detects that the management operation is an editing operation on the second location, the terminal may edit the POI information of the second location according to the editing operation. For example, the editing operation may be configured to allow the user to add remarks to the second location and/or rename the second location.

When the terminal detects that the management operation is a publishing operation on the second location, the terminal may release and upload the POI information of the second location to a predetermined website and/or a predetermined application corresponding to the publishing operation. For example, the terminal may upload the POI information, according to the user's instruction, to the user's homepage on www.tencent.com, or if the user wishes, publish the POI information of the second through WeChat, an application that allows people twitte between friends and/or public.

When the terminal detects that the management operation is a sharing operation on the second location, the terminal may store the POI information of the second location in a local storage area and/or a server corresponding to the sharing operation, and allowing a preset user corresponding to the share operation to check and modify the POI information of the second location.

Further, Step 101, which is acquiring a first location corresponding to the positioning instruction when detecting a positioning instruction, may include: when the terminal detects the positioning instruction, the terminal may acquire a current location of the terminal, and using the current location as the first location; or when the terminal detects a dragging operation that moves the map displayed in the first display area of the screen, the terminal may confirm that it received and/or detected the positioning instruction, and then load a map according to a movement track of the dragging operation, and at the end of the dragging operation the terminal may use a central location of the map displayed as the first location.

The dragging operation may be a slide operation on the map displayed in the first display area; and/or a drag operation by a mouse on the map displayed in the first display area; and/or a click operation and a positioning operation on a direction control key when the first display area may be selected; and/or a click operation on a direction option in the first display area; and/or a click operation on a direction option in a third display area.

The POI information associated with the first location may include: information of the POIs that are within a present threshold distance from the first location; and/or POI information having same keyword information as the first location.

The POI information having same keyword information as the first location may include: POI information having same street information as the first location; and/or POI information having same community information as the first location; and/or POI information having a same place name as the first location.

Additionally, the method may further include: when the first location is displayed on the map in the first display area on the screen and the first POI list is displayed in the second display area on the screen, displaying a search input box and a search option on the screen, so that the user may input a keyword by selecting the search option to send a search instruction to the terminal. When the terminal detects the search instruction, the terminal may search, according to the keyword carried by the search instruction, for POI information associated with the keyword. The terminal then may display the current location on the map in the first display area according to the current location; and display a second POI list in first order in the second display area, where the second POI list may include the POI information associated with the current location.

Additionally, the method may further include: when detecting a selection operation on any piece of POI information in the second POI list, acquiring a third location according to the POI information corresponding to the selection operation on the second POI list; displaying the third location on the map displayed in the first display area according to the third location; and displaying a third POI list in second order in the second display area, where the third POI list includes POI information associated with the third location.

Additionally, if the terminal receives an instruction to bookmark the POI information, it may conduct a bookmarking operation to the second location, and display the POI information of the second location in a favorites list. When the terminal receives a piece of POI information sent from another user, the terminal may be triggered by the piece of POI information and display an interaction object including the POI information. If the terminal detects a check operation on the interaction object, the terminal may display on the map the POI information at a location corresponding to the POI information.

The method may further include: when displaying the POI information, if a distance between the terminal and the location corresponding to the POI information is less than a preset threshold, the terminal may display a current location of the terminal on the map.

When the terminal receives the POI information sent by another user and displays the interaction object including the POI information, the method may further include: displaying an interaction object including address information and/or a POI title in the POI information. If the terminal detects a check operation to check what is on the interaction object, the terminal may display the POI information on the map at a location corresponding to the POI information. The POI information may include address information and/or a POI title in the POI information.

Figure 2:
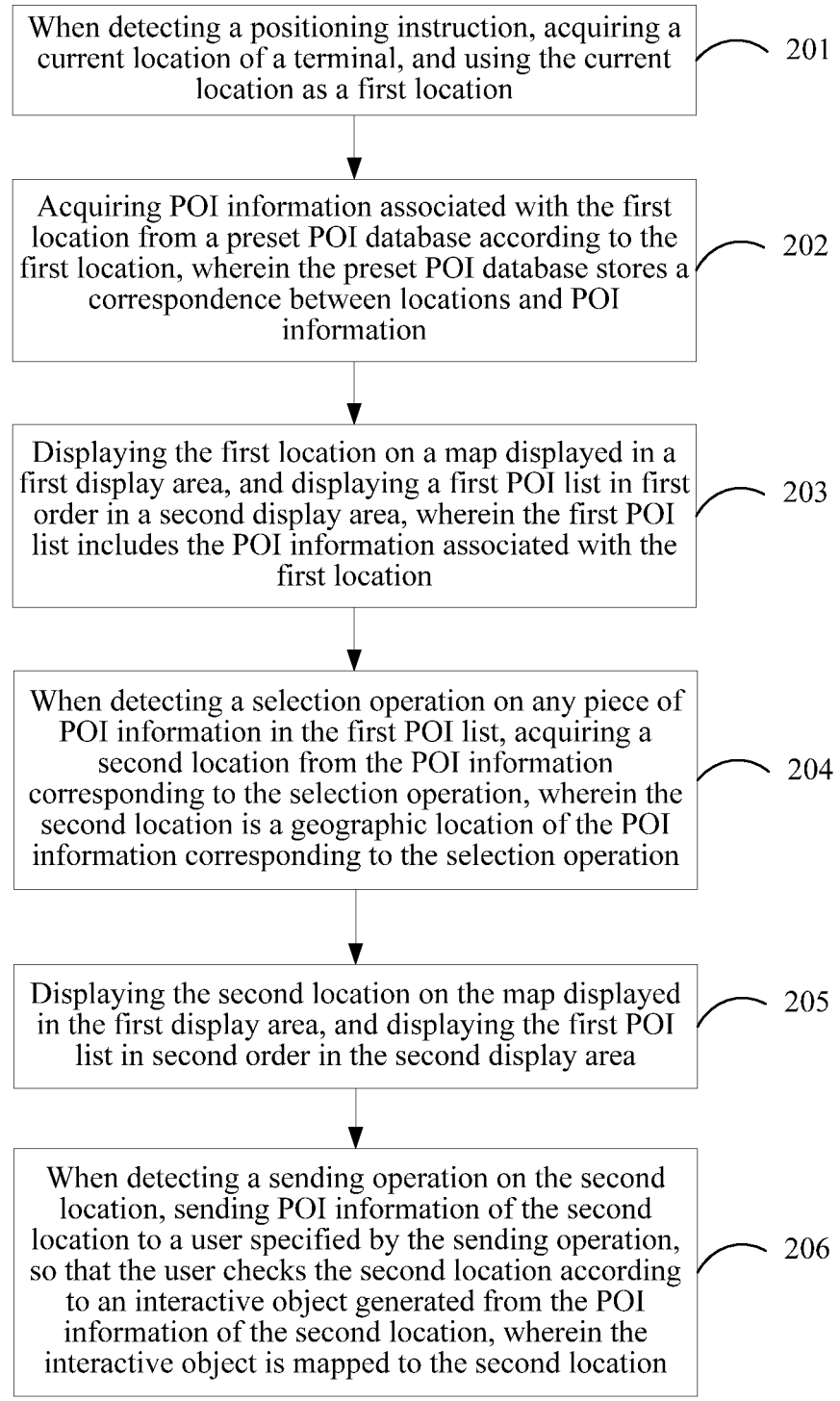
FIG. 2 is a flowchart of a method for displaying a geographic location provided by an example embodiment of the present disclosure.

FIG. 2 is a flowchart of another method for displaying a geographic location provided by an example embodiment of the present disclosure. The method may be stored in the memory unit 120 of the terminal 3500 as a set of program instructions. The program instructions may be an instant messaging application, through which a user sends a geographic location to a contact and/or a group during an interaction process of the instant messaging application. Further, the program instructions may be executed by the processor 180 of the terminal 3500 in FIG. 35. The set of instructions may direct the processor 180 to perform the following steps of the method:

201: When detecting a positioning instruction, acquire a current location of a terminal, and use the current location as a first location.

Figure 4:
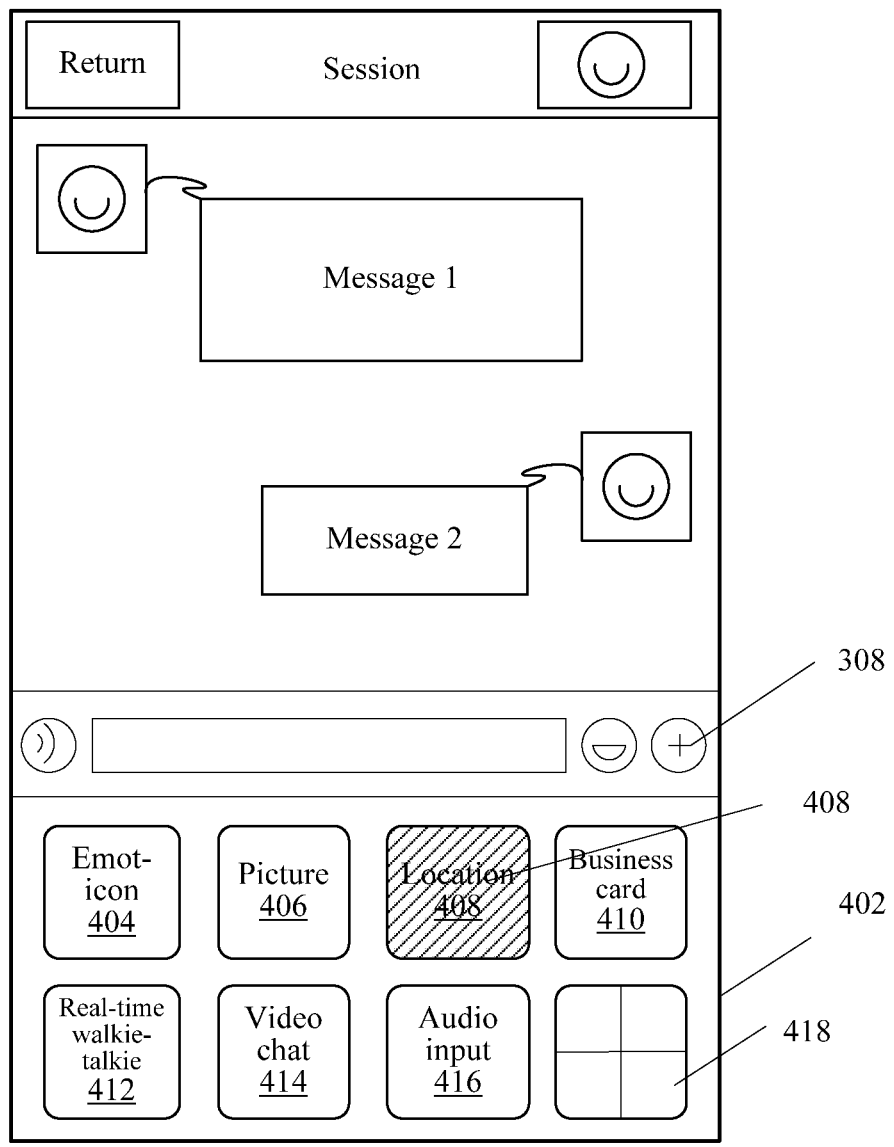

After logging in the instant messaging application stored in the memory unit 120 of the terminal 3500, a user may send geographic location information to a contact and/or a group. At this time, the user may activate an adding option in a session interface so that a first adding menu 402, as shown in FIG. 4, may be displayed. The user then may activate a location option in the first adding menu 402 to acquire a current location of the terminal.

Figure 3:
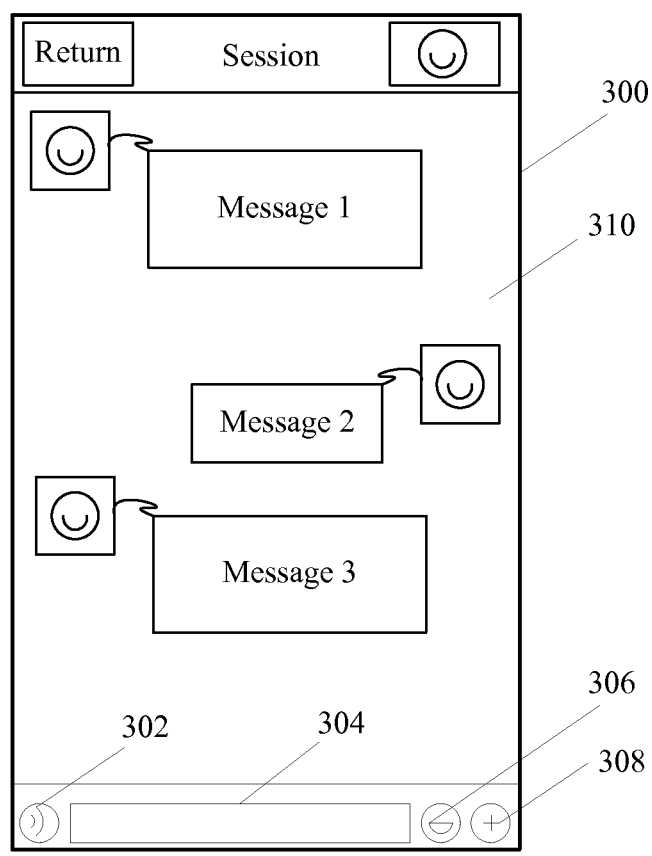

FIG. 3 shows a session interface 300 during a session process by using the specified application. The session interface 300 may include interaction content 310, a session input box 304, a voice option 302, an emoticon option 306, and an adding option 308. The adding option 308 may locate at the lower right corner of the interface. The adding option 308 may also be in front of the input box and/or at other locations in the interface. The example embodiment of the present disclosure does not limit the content of the session interface and/or the layout of the session interface.

FIG. 4 is a schematic view of an interface with an adding menu for displaying a geographic location. During the running of the specified application, when detecting a selection operation on the adding option 308 in any session interface 300 (as shown in FIG. 3), for example, detecting a click operation on the adding option, the terminal may unfold the first adding menu 402. As shown in FIG. 4, the first adding menu 402 may be located at a lower area in the session interface and may include options such as emoticon 404, picture 406, location 408, business card 410, real-time walkie-talkie 412, video chat 414, audio input 416, and tool adding 418. When the user selects the location option 408, for example, clicks the location option 408, the terminal may receive a positioning instruction, and at this time, the terminal may acquire a current location, and use the current location as the first location.

The above example embodiment of the present disclosure relates to a scenario where POI information that corresponds to the current location of the terminal includes a geographic location that the user wishes to send. If the current location (i.e., the first location) of the terminal is not exactly the geographic location that the user is interested in, the user may further select another location from the map after the terminal detects the current location. Accordingly, the method may further include the following steps after Step 201: when the terminal detects a dragging operation to the map displayed in the first display area, the terminal may confirm that a positioning instruction is also received, load the map according to a track of the dragging motion, and then take the central location of the map displayed at the end of the dragging operation as the first location. The dragging operation may be a slide operation on the map displayed in the first display area; a dragging operation by a mouse on the map displayed in the first display area; a click operation and a positioning operation on a direction control key when the first display area is selected; a click operation on a direction option in the first display area; and/or a click operation on a direction option in a third display area.

The first display area may be a map display area, and the second display area may be a POI information display area.

Figure 5:
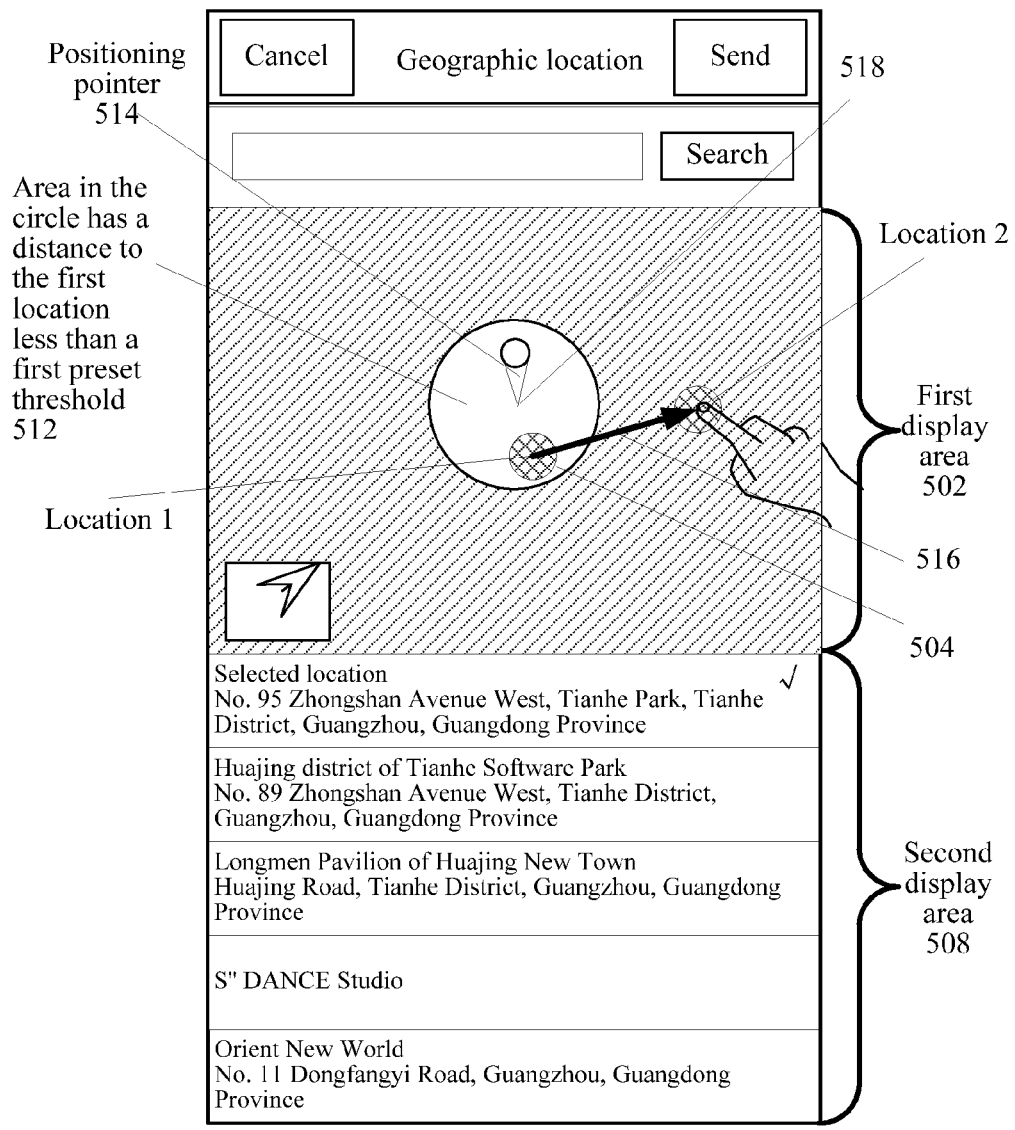

FIG. 5 is a schematic view of an interface for displaying a geographic location on a terminal. If the currently used terminal is a terminal with a touch screen, when a slide operation 516 to the map displayed in the first display area 502 is detected, the terminal may load the map according to a movement track of the slide operation 516, and when the slide operation is finished, a central location 504 of the map displayed at the end of the slide operation may be used as the first location, as shown in FIG. 5. FIG. 5 shows using a finger to conduct the slide operation. The finger moves from location 1 to location 2 through one slide action.

Similarly, if the dragging operation is conducted by a mouse, rather than a finger, on the map displayed in the first display area 502, the terminal may load the map according to the movement track of the drag operation 516. When the drag operation is finished, a central location 518 of the map displayed at the end of the drag operation 516 may be used as the first location.

Similarly, when the dragging operation is conducted through a clicking a control key, the terminal may detect, the click operation and a positioning operation on a direction control key. Correspondingly, the terminal may move the map along a direction the same as a direction corresponding to the key of the click operation. For example, when an upward direction control key is clicked, the map may be moved upward correspondingly; the map may be loaded according to the movement track, and a central location of the map displayed at the end of the click operation may be used as the first location.

When a click operation on a direction option in the first display area may be detected, and/or a click operation on a direction option in a third display area may be detected, according to the direction option corresponding to the click operation, the map may be moved along a direction indicated by the direction option.

202: Acquiring POI information associated with the first location from a preset POI database according to the first location, wherein the preset POI database stores a correspondence between locations and POI information.

The preset POI database may be stored on a remote server, and Step 202 may further include: the terminal may send an acquisition request to the server, wherein the acquisition request may carry the first location so that the server may acquire POI information associated with the first location from the preset POI database according to the first location; In return, the server send to the terminal the POI information associated with the first location acquired from the preset POI database.

203: the terminal may display the first location on a map displayed in the first display area 502, and display a first POI list in first order in a second display area 508, wherein the first POI list may include the POI information associated with the first location.

The first order may be an ascending order of distances to the first location. Alternatively, the first order may also be an alphabetical order of first letters of the POI sorted from A to Z, or other possible orders, which are not limited by the example embodiment of the present disclosure.

In the example embodiment of the present disclosure, the POI information may include, but may be not limited to, a POI title, address information (such as a street name), and a POI type.

When the map is displayed, the terminal may determine a display size of the map according to a display manner of the terminal. To facilitate recognition, when the map is displayed, the first location 502 may be indicated by a positioning pointer 514 on the map.

The POI information associated with the first location may be determined in the following manners: (1) information of a POI that has a distance to the first location less than a preset threshold, for example, with a distance to the first location less than 10 kilometers; and (2) POI information having same keyword information as the first location, where the POI information having the same keyword information as the first location may include: POI information having same street information as the first location, POI information having same community information as the first location, and/or POI information having a same place name as the first location. For example, if the first location is "Baiyun Mountain Scenic Area, South Yunshan Road, Baiyun District, Guangzhou, Guangdong Province", the POI information associated with the first location may be information of a POI whose address includes the location of "South Yunshan Road", and/or POI whose address includes the location of "Baiyun District", and/or POI whose address includes the location of "Baiyun Mountain Scenic Area". The first preset threshold may be set by a technician during development of the program application, and may also be customized and/or adjusted by a user in using, which is not limited by the example embodiment of the present disclosure.

Figure 6:
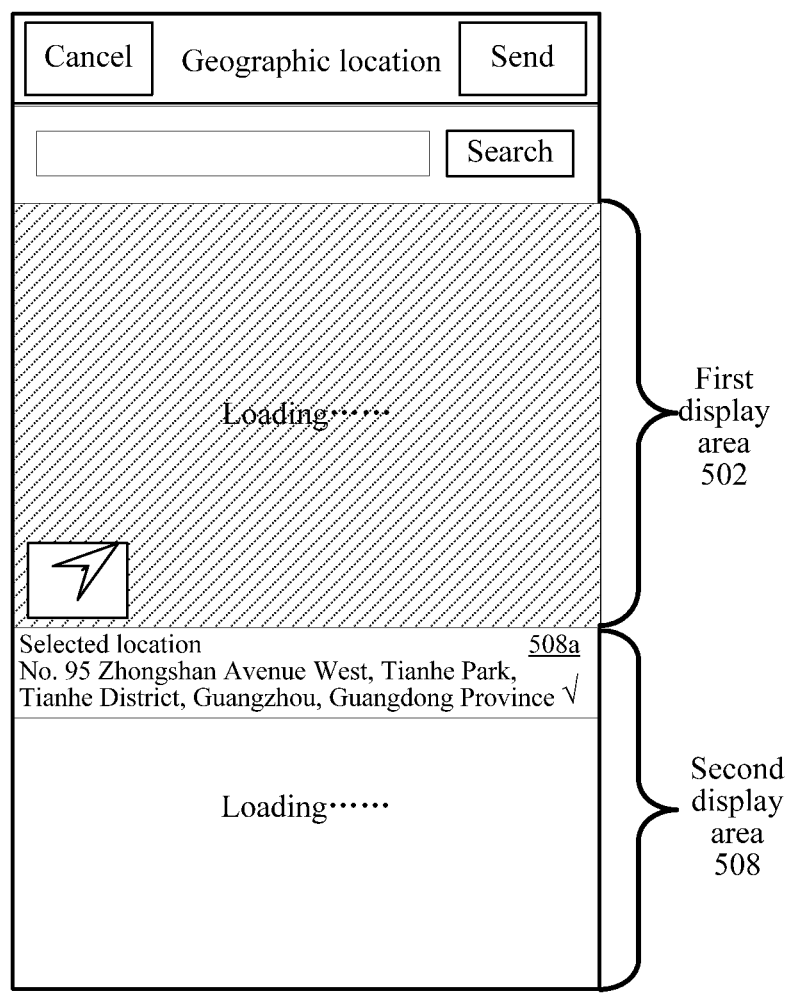
Figure 7:
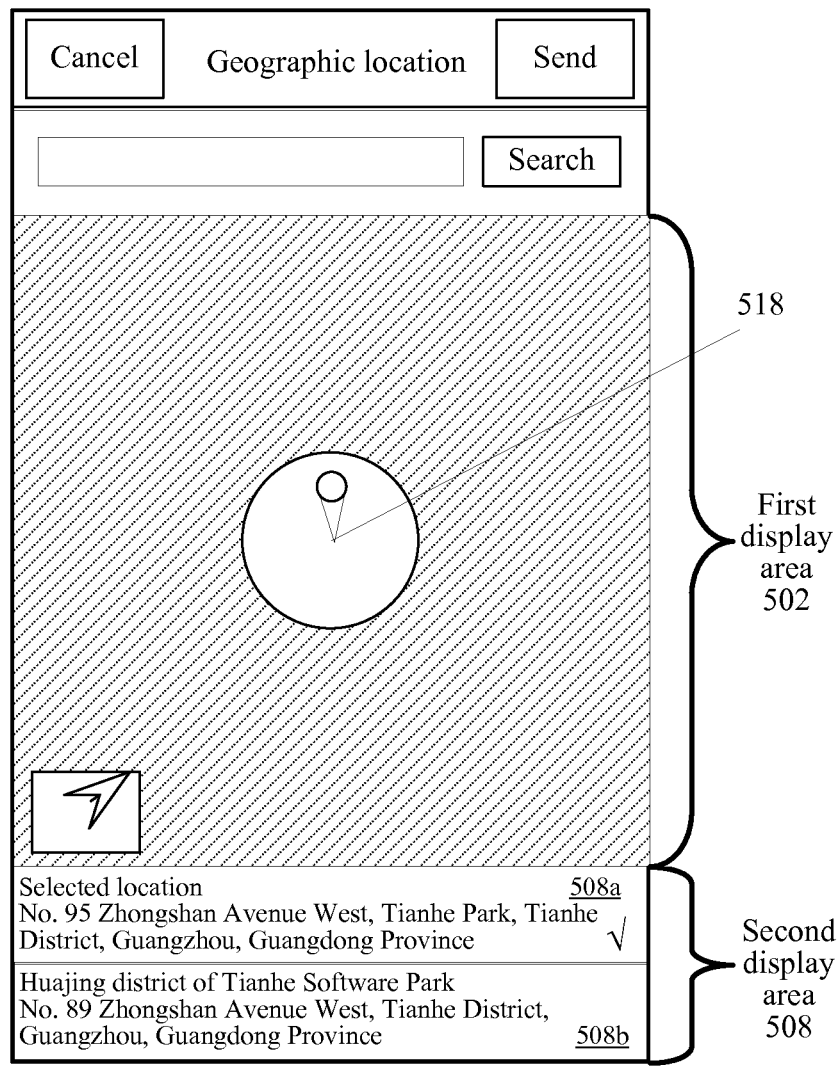

Furthermore, when acquiring the map and the POI list, the terminal may display a loading effect on a POI information selection interface (as shown in FIG. 6). When acquiring the map and the first POI list, the terminal may display the first location on the map displayed in the first display area 502, and displays a first preset amount of POI information in the second display area 508 according to an ascending order of distances to the first location (as shown in FIG. 7). The first preset amount may be set by a technician during program application development, and may also be customized and/ or adjusted by a user in using, which is not limited by the example embodiment of the present disclosure.

Figure 8:
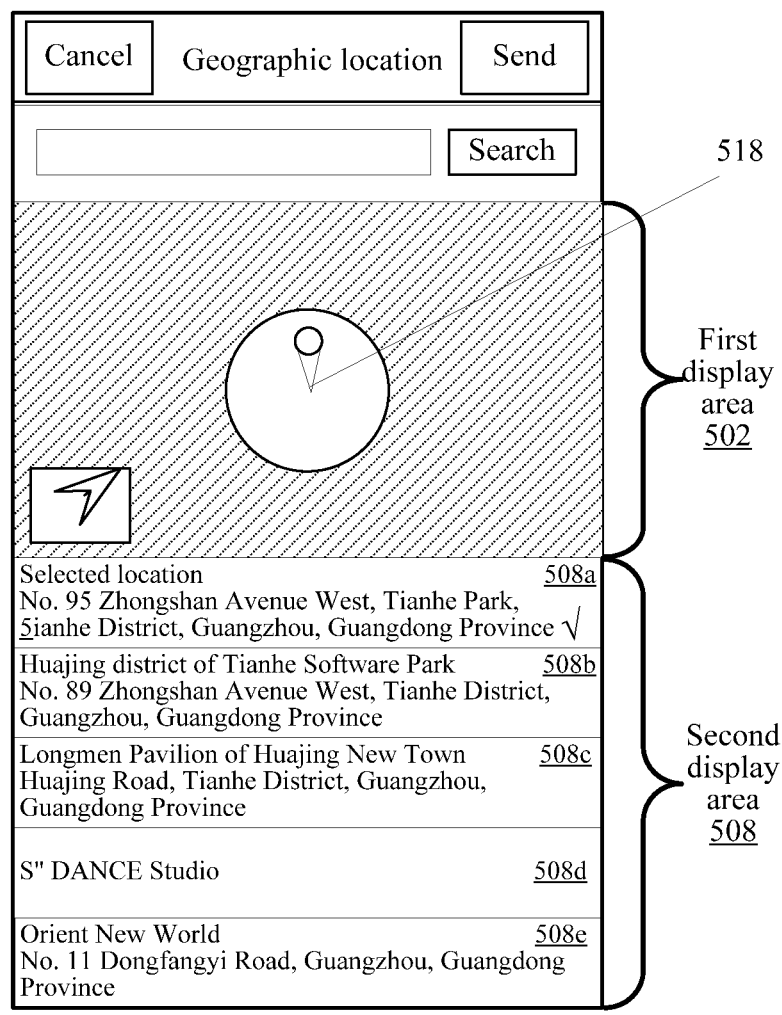

FIG. 7 shows an interface of the terminal when the loading of information such as a map and POI list is finished. In this interface, the map may be displayed in the first display area 502, and the first location 518 may be displayed on the map. A POI list corresponding to the first preset amount of POI information associated with the first location 518 may be displayed in the second display area 508. FIG. 7 only shows a first entry 508*a* in the POI list is shown as a POI information entry corresponding to the currently selected location, namely, the first location 518. Other entries in the POI list, which are not shown, may be POI information entries listed from top to down according to an ascending order of distances to the current location. Initially, the terminal may only display a first preset number of POI information entries in the second display area 508. For example, the first preset number may be two. Accordingly, only two POI information entries 508*a*, 508*b* may be displayed (as shown in FIG. 7). If the number of acquired POI information entries is less than the first preset number (e.g., only one entry of POI information is acquired), only the acquired POI information entries may be displayed. If the number of acquired POI information entries is greater than the first preset number (e.g., the terminal acquires three pieces of POI information), the terminal may display the POI information up to a first preset number of POI information entries (e.g., only two pieces of POI information are displayed). Further, if the terminal detects an upward slide operation on the second display area 502, the terminal may increase the number of displayed items and display acquired POI information up to a second preset number of entries. For example, the second preset number may be five. Accordingly, the number of POI information entries 508*a*, 508*b*, 508*c*, 508*d*, 508*e* to be displayed in the second display area 508 may be increased to five, as shown in FIG. 8. When a POI information entry is displayed on the second display area 508, the terminal may also display a POI title and address information, like the second POI information entry 508*b* shown in FIG. 8. If the POI information does not include corresponding address information, only a POI title may be displayed, like the third POI information entry 508*c* displayed in FIG. 8. In addition, the interface displayed in FIG. 8 may be described by using an example where five POI information entries may be displayed when the second preset number may be five, and the example embodiment of the present disclosure does not limit the display content in entries, a display order of the entries, and/or the number of displayed items.

Figure 9:
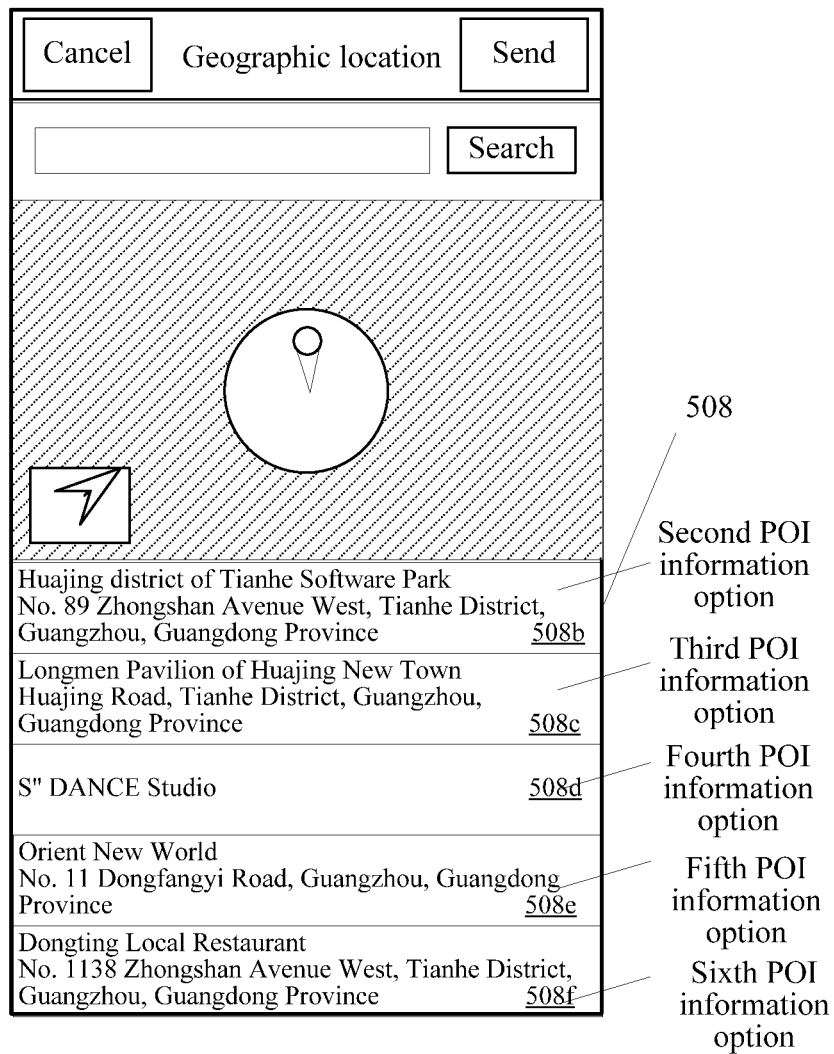

In addition, in the event that a second preset number of POI information entries is displayed in the current interface, and the number of acquired POI information entries is greater than the second preset number, when a slide operation on the POI list may be detected (e.g., a user of the terminal slides her finger up and/or down on the second display area 508), the terminal may scroll the POI list at the same speed along the same direction as the slide operation, so as to update the POI information entries and under the limitation of the second present number. For example, if the second preset number is five and the terminal acquires eight pieces of POI information, the POI information selection interface may only display POI information entries corresponding to first five pieces of POI information currently, as shown in FIG. 8. When an upward slide operation on the POI list is detected and the slide operation slides the POI list for a distance of one POI information entry, the terminal may scroll the POI information entries upward for one POI information entry at the same speed as the slide operation. The number of POI information entries displayed in the second display area 508 may keep the same as the second preset number (five entries) defined. As a result, the terminal may display the POI information entries corresponding to the second to sixth pieces of POI information, as shown in FIG. 9.

When the first location in Step 203 is determined through a dragging operation in Step 201, if the map is dragged to a distance greater than or equal to a preset length, the terminal may display the first location and the first POI list according to the method provided in Step 203; and if the distance is less than the preset length, only the map will to be updated while the first POI list does not need to be updated. Using FIG. 5 as an example, if a distance from location 1 to location 2 is less than the preset length, it may be unnecessary to update the first POI list.

204: When detecting a selection operation on any piece of POI information in the first POI list, acquiring a second location from the POI information corresponding to the selection operation, wherein the second location may be a geographic location of the POI information corresponding to the selected POI information.

The current geographic location of the user, i.e., the first location, may or may not be a location that the user is interested in, either saving in the terminal or sending to a friend. Frequently, the user may stand near a place, but not exactly that place, where she is truly interested in, and the place (i.e., target POI) that she is interested in appears in the POI list that corresponds to the first location. In this scenario, the user may select the corresponding target POI information entry in the POI list as a geographic location to save and/or send. The terminal may determine the geographic location of the target POI as a second location. For example, the user may click the third POI information entry 508c in the POI list displayed in FIG. 8, and the terminal uses a geographic location corresponding to address information "Huajing Road, Tianhe District, Guangdong, Guangzhou Province" in POI information of the third POI information entry as the second location, which is shown as the first entry on the second display area 508.

205: Displaying the second location on the map displayed in the first display area, and display the first POI list in a second order in the second display area.

The second order may be an order in which a POI information entry corresponding to the second location may be used as a first item, and starting from a second item, other entries in the first POI list except the POI information entry corresponding to the second location may be displayed in first order, i.e., the second order is identical to the first order except that the selected POI information entry (i.e., the target POI information entry) is listed as the first entry.

Figure 10:
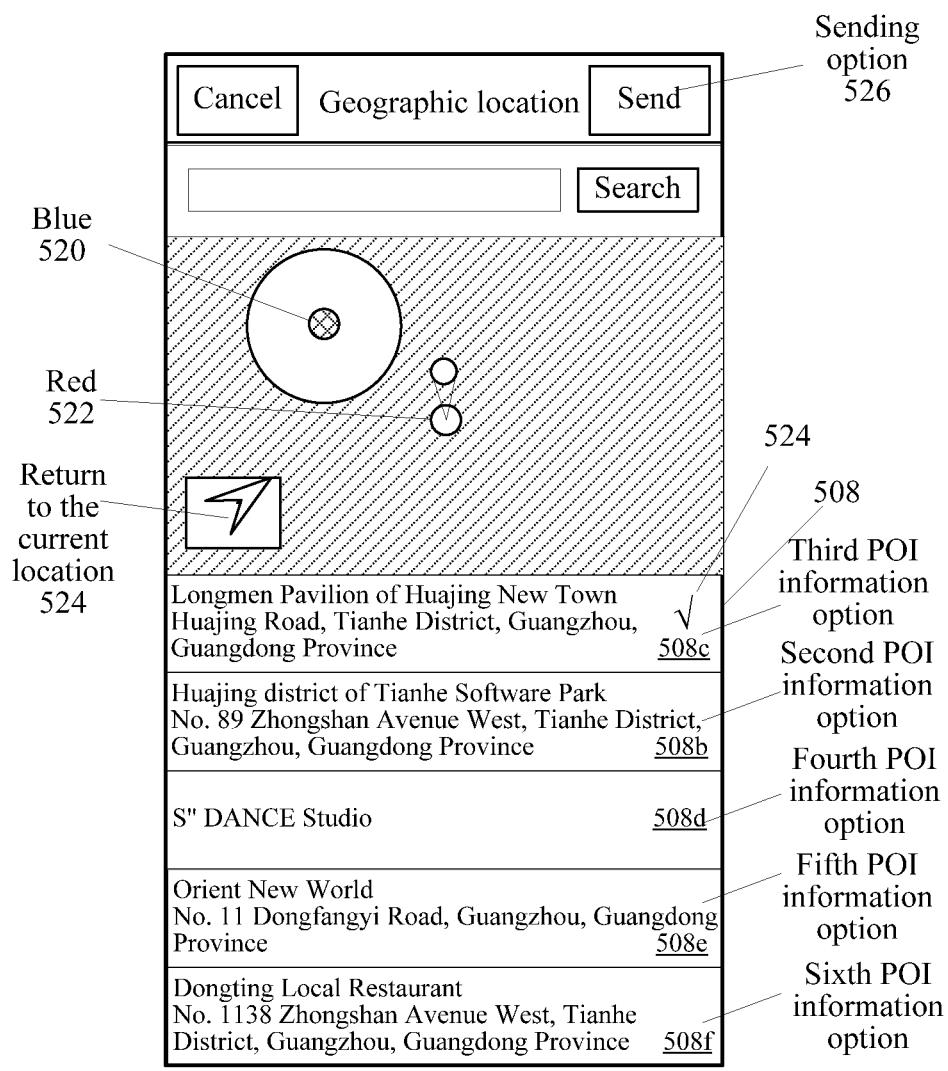

Similar to Step 203, FIG. 10 shows a display interface for the second location in the POI information selection interface. The map displayed in the first display area 502 in FIG. 10 displays the second location 522, and to distinguish the second location 522 from the first location 520, the first location 520 and the second location 522 may be marked with different colors, for example, the first location 520 (namely, the current location) may be marked with a blue point, and the second location 522 may be marked with a red point, so that the user may acquire a location relationship between the second location marked with the red point and the current location. The POI list display area in FIG. 10 displays POI information entries in the first POI list.

Furthermore, in the POI list display area, i.e., the second display area 508, a POI entry of the originally selected location may be replaced with a POI information entry corresponding to the second location, and a check mark 524 may be added in the POI information entry corresponding to the second location, for example, "√" may be displayed at the right end of the entry to indicate that the entry has been selected. Starting from the second entry, other POI information entries may be displayed according to the original order, as shown in FIG. 10.

In addition, in the POI information selection interface, a display interface for the second location may further include an option 524 for returning to the current location, as shown in FIG. 10. When the terminal detects a selection operation on the option 524, for example, a click operation on the option of returning to the current location, the terminal may display, in the POI information selection interface, a display interface for the first location, as shown in FIG. 8.

Step 201 to Step 205 may be a process for determining the second location. After the second location may be determined, the POI information of the second location may be managed according to a management operation on the second location, and the management operation may include, but is not limited to, a bookmarking operation, a sending operation, an editing operation, a release operation, and a share operation, where the editing operation may include adding remark information and/or renaming the POI information.

Step 205 may be an optional step. A second location already selected by the user may be used as a location to be managed, and be managed directly. To provide more options for the user, Step 205 may further be performed to display a map and a POI list corresponding to the second location, so that the user may further lock a location to be managed according to specific content displayed.

206: When detecting a sending operation on the second location, sending the POI information of the second location to a receiver specified by the sending operation, so that the user checks the second location according to an interactive object generated from the POI information of the second location, where the interactive object may be mapped to the second location.

The interaction object may include the POI information of the second location, so that the terminal may perform positioning to obtain the second location on the map according to the POI information of the second location.

Step 206 may include: when detecting a sending operation on the second location, sending the second location to a receiver specified by the sending operation, so that the receiver displays an interaction object including the POI information of the second location; by means of a check operation on the interaction object, displaying on the map the POI information at a location corresponding to the POI information, so as to perform positioning to obtain the second location; and generating an interaction object on an interaction interface of the receiving terminal according to the POI information of the second location, so that a user of the receiver may check the interaction object.

Figure 11:
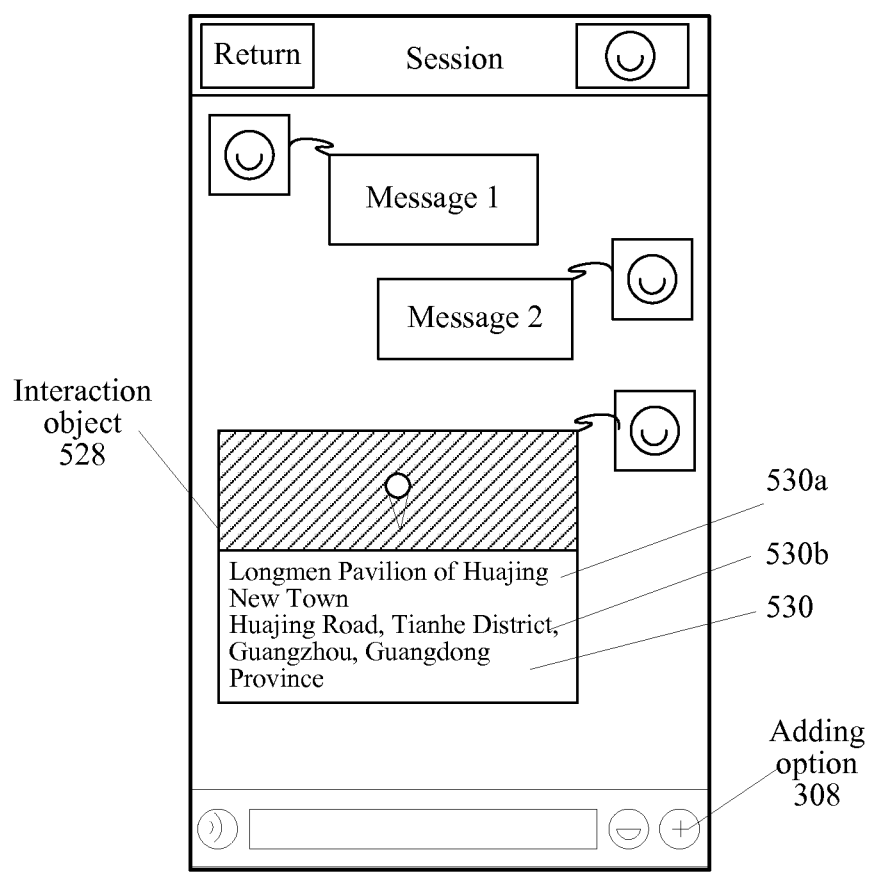
Figure 12:
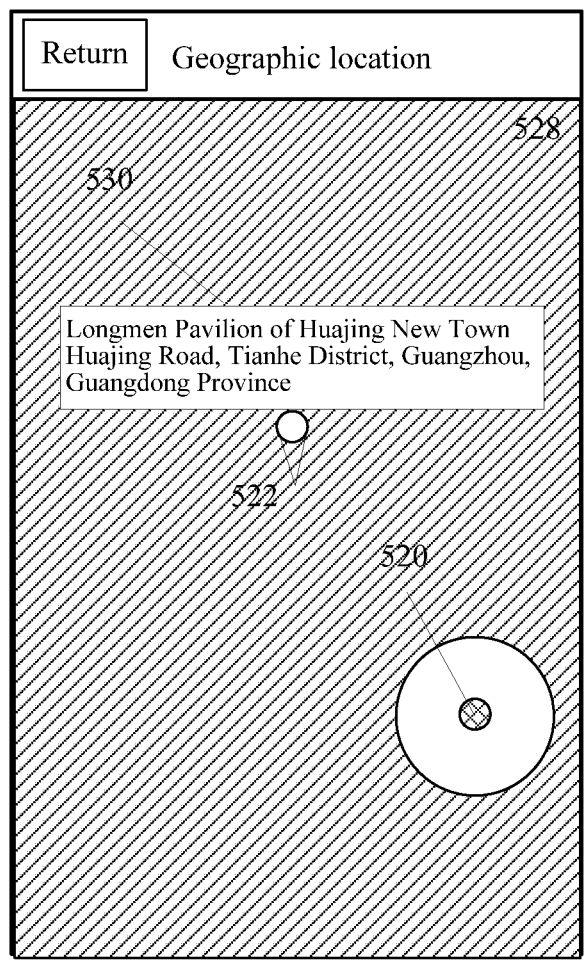

As shown in FIG. 10, in the POI information selection interface, the display interface for the second location may include a sending option 526, and when the terminal detects a click operation on the sending option 526, that is, when the terminal detects a sending operation on the second location, the terminal may generate an interaction object 528 and send the interaction object 528 to the receiver, as shown in FIG. 11, wherein the interaction object 528 may include a POI title 530a and/or address information 530b of the second location. When opening the interaction object, the receiver may perform positioning to obtain the second location by using the POI information 530 included in the interaction object 528, and the POI information 530 may be displayed, as shown in FIG. 12. As shown in FIG. 13, the interaction object 528 may have three different display manners: (1) the interaction object 528 only displays the address information 530b; (2) the interaction object 528 displays the POI title 530a and the address information 530b; and (3) the interaction object 528 only displays the POI title 530a. The display manner of the interaction object may be set by a technician during program development, and may also be customized and/or adjusted by a user in using, which is not limited by the example embodiment of the present disclosure.

After sending the second location, the user of the receiver (e.g., a receiving terminal) may check the second location by using the interaction object generated according to the POI information of the second location; when a click operation on the interaction object is detected, a map of a third preset range corresponding to the second location may be opened, and the POI information of the second location may be displayed in an area corresponding to the second location on the map. As shown in FIG. 14, the POI information of the second location may be displayed in three different manners: (1) only address information of the POI information of the second location may be displayed; (2) a POI title and address information of the POI information of the second location may be displayed; and (3) only a POI title of the POI information of the second location may be displayed. The display manner of the POI information of the second location may be set by a technician during program development, and may also be customized and/or adjusted by a user in using, which may be not limited by the example embodiment of the present disclosure.

Figure 15:
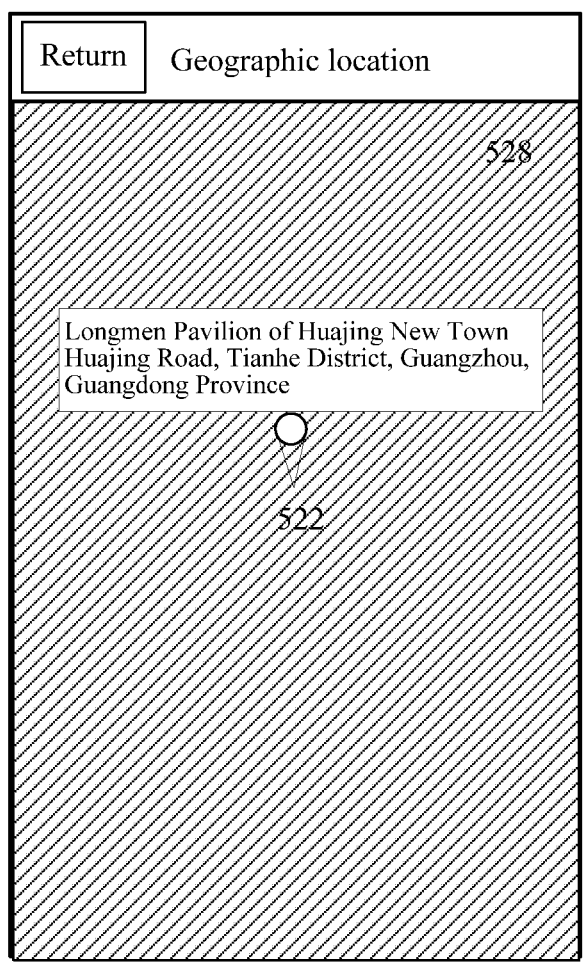

It should be noted that, when the POI information is displayed, if a distance between a terminal and the location corresponding to the POI information is less than a preset threshold (e.g., 50 meters), both the POI and the current location may be shown on the map, as shown in FIG. 12; and when the distance is equal to or greater than the preset threshold, the current location may be not displayed, thus only the selected POI is shown in the map, as shown in FIG. 15.

In addition, in Step 206, the second location may be managed as follows: (1) when an editing operation on the second location is detected, the POI information of the second location may be edited, where the editing operation may include adding remark information and/or renaming. For example, when the second location is the location of the company of the user, a remark "my company" may be added in the POI information of the second location, and/or the POI information of the second location may be renamed as "my company". (2) When a release operation on the second location is detected, the POI information of the second location may be released to a website and/or an application corresponding to the release operation. For example, the POI information of the second location may be released to a microblog, an SNS community, and so on. (3) When a share operation on the second location is detected, the POI information of the second location may be stored in a local storage area and/or server corresponding to the share operation, and a preset user corresponding to the share operation may be allowed to check and modify the POI information of the second location. For example, the POI information of the second location may be stored on a shared server of the company of the user, so that all staff of the company may access the POI information of the second location through the shared server, and modify the POI information of the second location.

In the above methods provided by the example embodiments of the present disclosure, the first location selected by a user may be displayed on the map, and the map around the first location and the POI list may be also displayed. Not only the positioning for the address information of the first location but also the first location and POI information around may be displayed, which makes it convenient for the user to perform searching according to the POI information and obtain a surrounding environment of the first location. By selecting POI information in the POI list, the user may directly obtain, through positioning, a second location corresponding to the selected POI information, and operations such as sending the second location may be implemented, thereby achieving more precise and refined positioning and making it more convenient and efficient to share the location.

Figure 16:
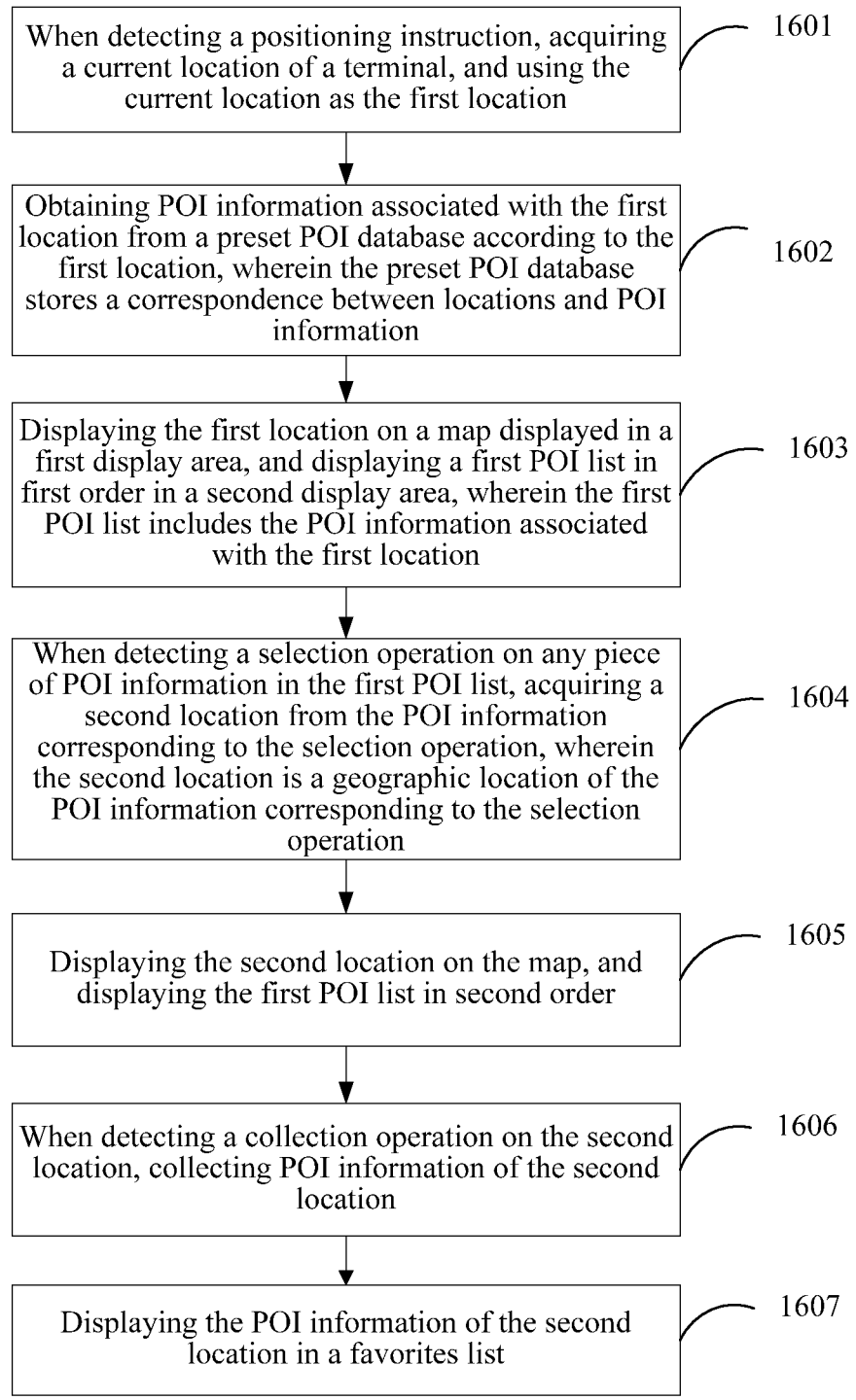
FIG. 16 is a flowchart of a method for displaying a geographic location provided by an example embodiment of the present disclosure.

FIG. 16 is a flowchart of another method for displaying a geographic location provided by an example embodiment of the present disclosure. The method may be stored in the memory unit 120 of the terminal 3500 as a set of program instructions. The program instructions may be executed by the processor 180 of the terminal 3500 in FIG. 35. The set of instructions may direct the processor 180 to perform the following steps of the method. In a scenario where the specified application is an instant messaging application, and a geographic location selected by the user is bookmarked by using the instant messaging application, the method may include the following steps:

1601: When detecting a positioning instruction, acquiring a current location of a terminal, and use the current location as the first location.

After logging in the instant messaging application, the user may bookmark a geographic location, wherein the bookmarking may refer to a process of saving the geographic location and synchronizing the saved geographic location to a server.

Figure 17:
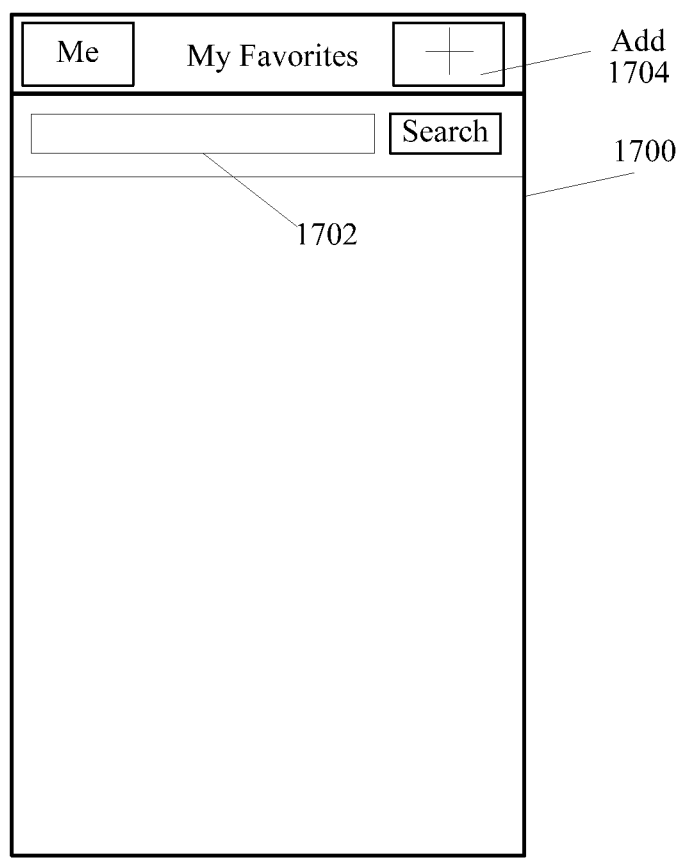
FIGS. 17-25 is schematic views of a display interface in a method for displaying a geographic location provided by an example embodiment of the present disclosure.
Figure 18:
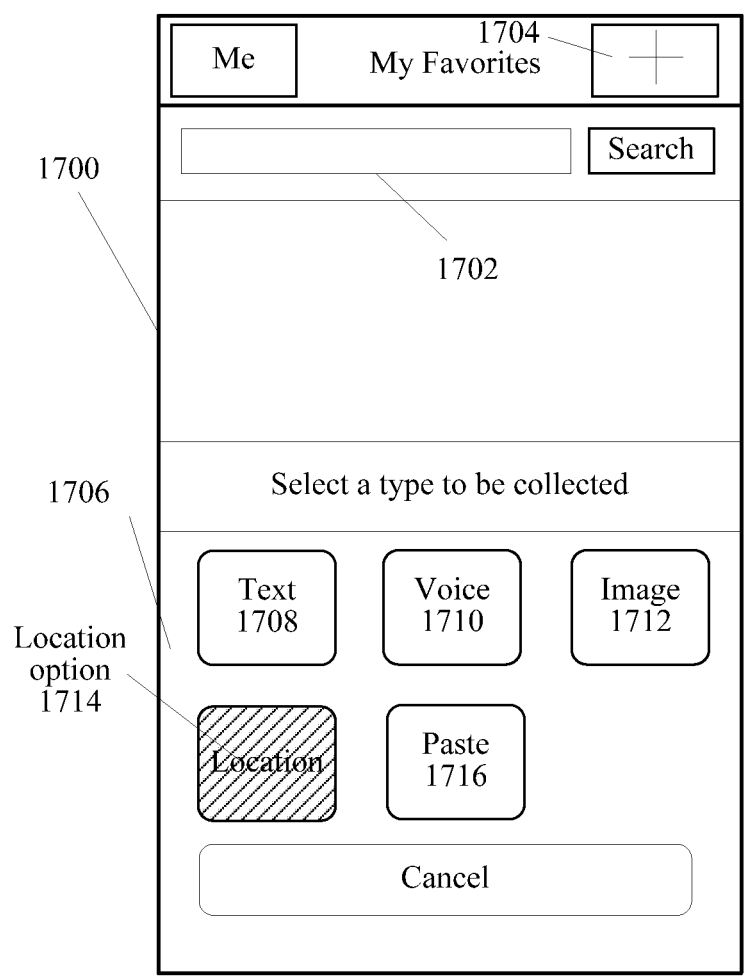

During running of the instant messaging application, when the user enables a "My Favorites" function of the instant messaging application, the user may enter a "My Favorites" interface 1700, as shown in FIG. 17, wherein the "My Favorites" interface 1700 may include a search input box 1702, an adding option 1704, and so on. When detecting a selection operation on the adding option 1704, the terminal may display a second adding menu 1706 (as shown in FIG. 18), where the second adding menu 1706 may be located at a lower area in the "My Favorites" interface 1700, and provide object type options that the user may select, including options such as text 1708, image 1712, voice 1710, location 1714, and paste 1716. When detecting a selection operation on the location option 1714, such as a click operation on the location option, the terminal may acquire a current location, and uses the current location as the first location.

If the terminal has determined a selected location, and a map and POI list corresponding to the selected location has currently been displayed, Step 1601 may be replaced by the following step: when detecting a dragging operation on the map displayed in a first display area, confirming that a positioning instruction has been received, loading a map according to a movement track of the dragging operation, and using a central location of the map displayed at the end of the dragging operation as the first location. The dragging operation may be a slide operation on the map displayed in the first display area; and/or, a dragging operation by a mouse on the map; and/or, a click operation and a positioning operation on a direction control key when the first display area is selected; and/or, a click operation on a direction option in the first display area; and/or, a click operation on a direction option in a third display area.

Figure 19:
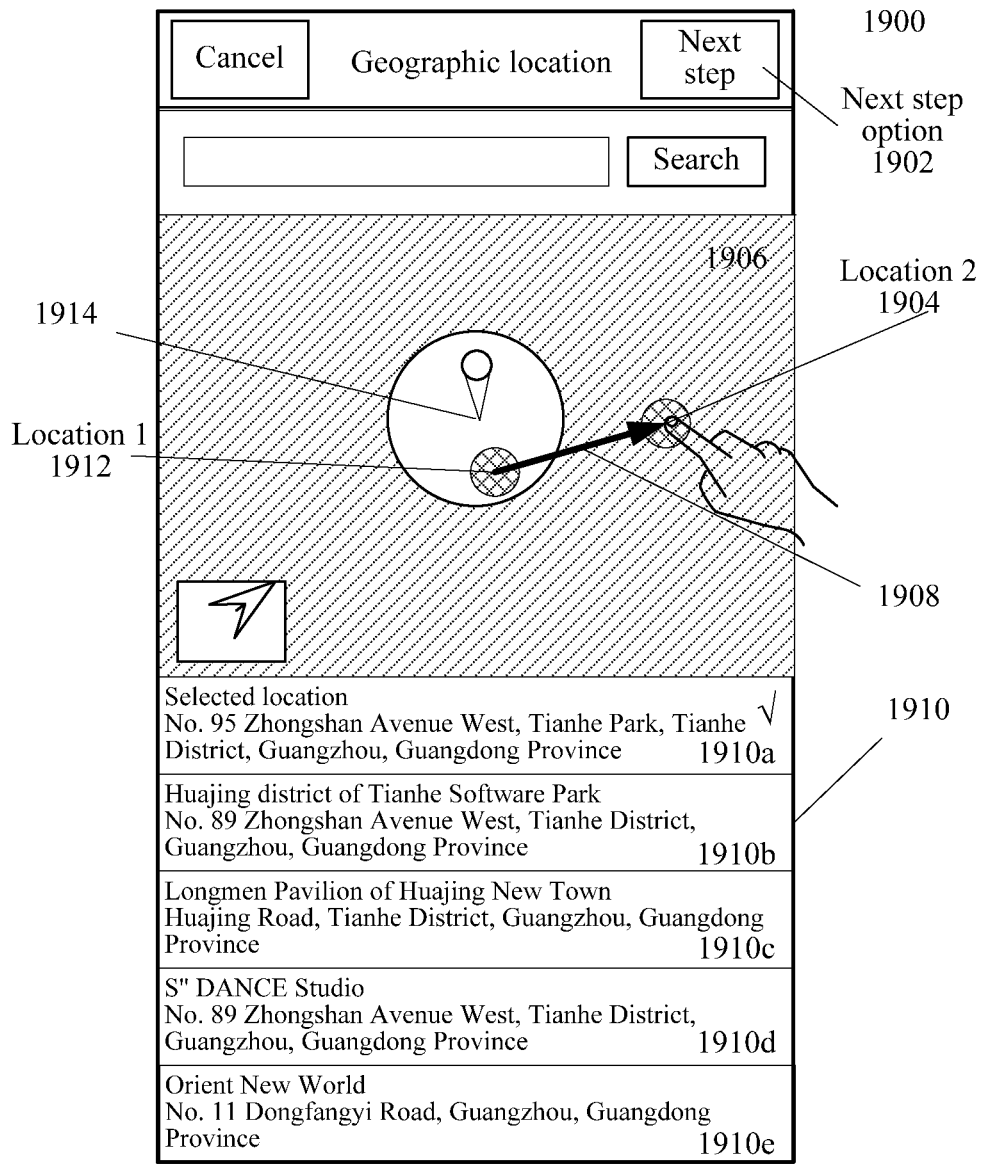

When a slide operation is detected, a map may be loaded according to a movement track of the slide operation, and when the slide operation is finished, a central position of the map displayed at the end of the slide operation may be used as the first location. In FIG. 19, a slide operation performed with a finger may be used as an example for description, and the finger may move from location 1 1912 to location 2 1904 through one slide action 1908. When a dragging operation by a mouse on the map displayed in the first display area 1906 is detected, the map may be loaded according to a movement track of the dragging operation, and when the drag operation is finished, a central location of the map displayed at the end of the drag operation may be used as the first location. When the first display area 1906 is selected, and a click operation and a positioning operation on a direction control key is detected, the map may be moved along a direction the same as a direction corresponding to a key of the click operation. For example, when an upward direction control key is clicked, the map may be moved upward correspondingly; the map may be updated according to the movement track, and a central location of the map displayed at the end of the click operation may be used as the first location. When a click operation on a direction option in the first display area is detected, and/or a click operation on a direction option in a third display area is detected, according to the direction option corresponding to the click operation, the map may be moved along a direction indicated by the direction option.

1602: Acquiring POI information associated with the first location from a preset POI database according to the first location, wherein the preset POI database stores a correspondence between locations and POI information.

1603: Displaying the first location on a map displayed in a first display area, and displaying a first POI list in first order in a second display area, wherein the first POI list may include the POI information associated with the first location.

The first order may be an ascending order of distances to the first location.

1604: When detecting a selection operation on any piece of POI information in the first POI list, acquiring a second location from the POI information corresponding to the selection operation, wherein the second location may be a geographic location of the POI information corresponding to the selection operation.

When the first location is not a geographic location that the user wants to bookmark, the user may select a certain POI information entry in the POI list as a geographic location to be bookmarked.

1605: Displaying the second location on the map displayed in the first display area, and displaying the first POI list in second order in the second display area.

Steps 1602-1605 are similar to Steps 202-205, and thus are described herein again.

1606: When detecting a bookmarking operation on the second location, bookmarking POI information of the second location.

Figure 20:
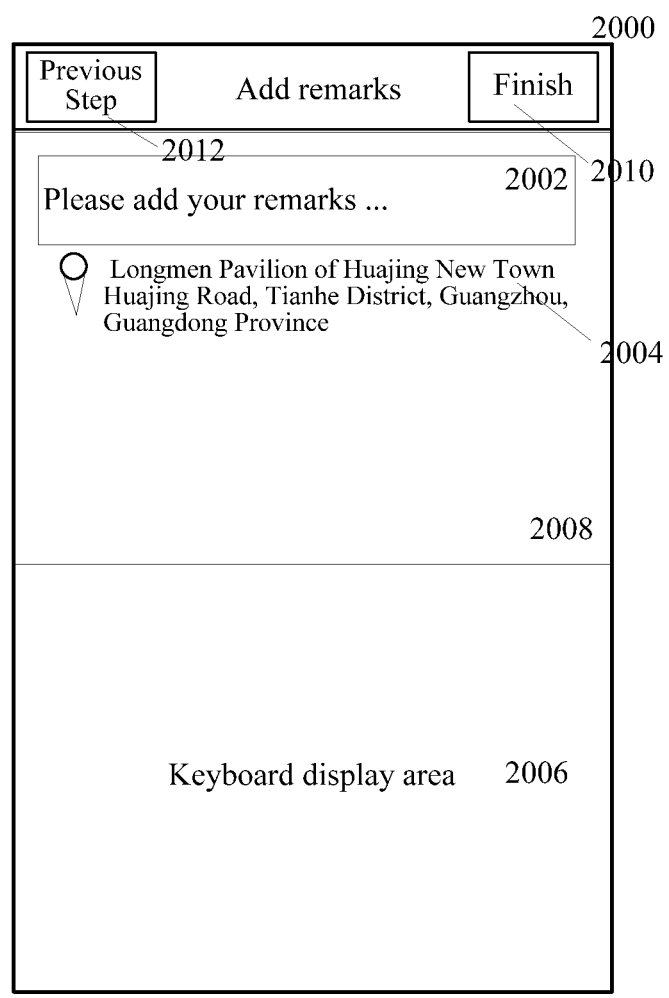

A POI information selection interface during the bookmarking of the geographic location may be similar to the POI information selection interface used when the geographic location is sent. However, the POI information selection interface during the bookmarking of the geographic location further may include a next step option 1902, wherein the next step option 1902 may be used for triggering operations such as adding remarks for the geographic location. When detecting a selection operation on the next step option 1902, the terminal may display a remark adding interface 2000, as shown in FIG. 20, where the remark adding interface 2000 may include a display area 2008 of bookmarked geographic information, a keyboard display area 2006, a remark input box 2002, and options such as a finish option 2010 and a previous step option 2012. When detecting an input operation on the remark input box 2002, the terminal may add remark information for the bookmarked geographic information, so that the terminal may perform displaying according to the POI information and remark information of the second location. When detecting a selection operation on the finish option 2010, the terminal may finish the bookmarking operation.

1607: Displaying the POI information of the second location in a favorites list.

Figure 21:
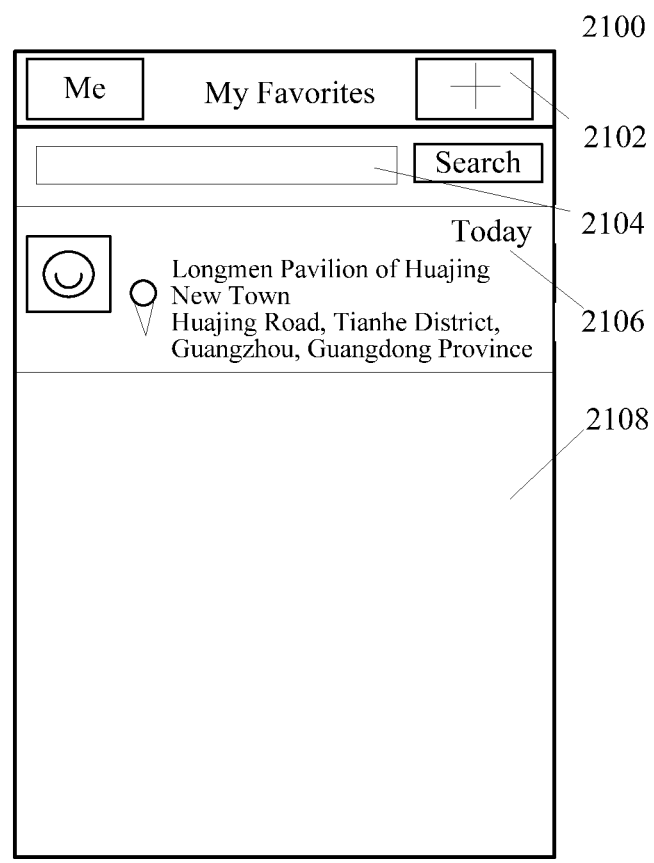
Figure 22:
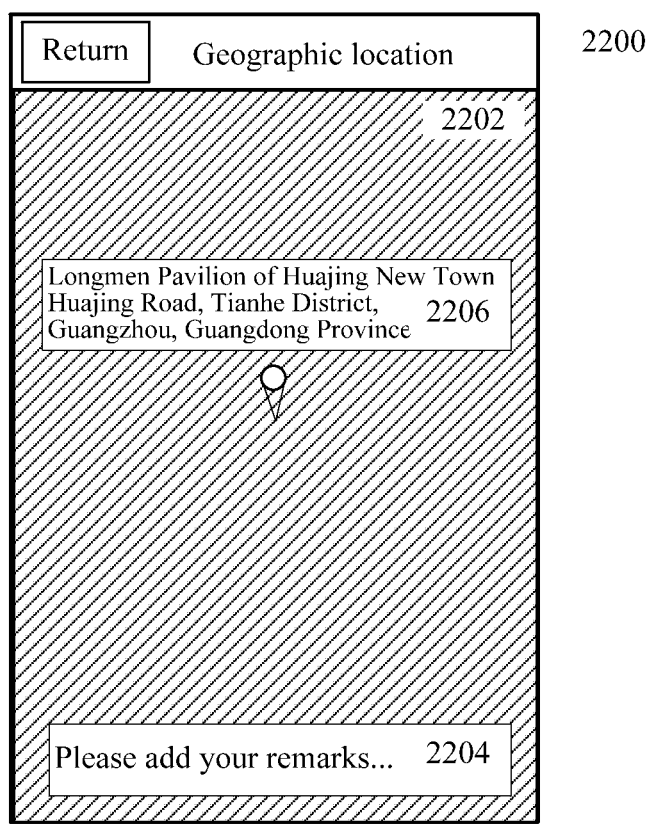
Figure 23:
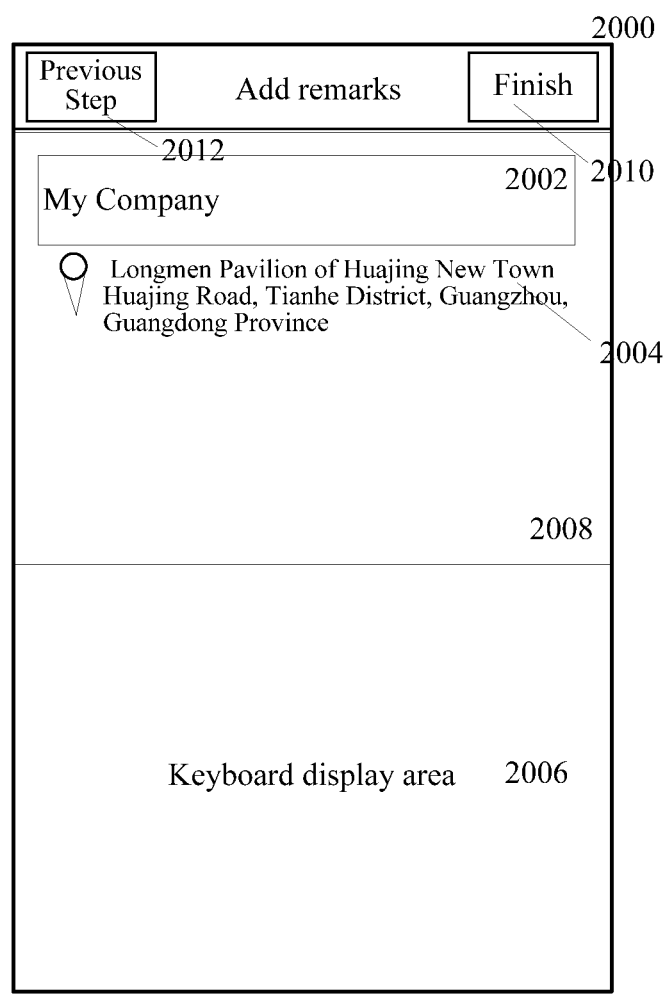
Figure 24:
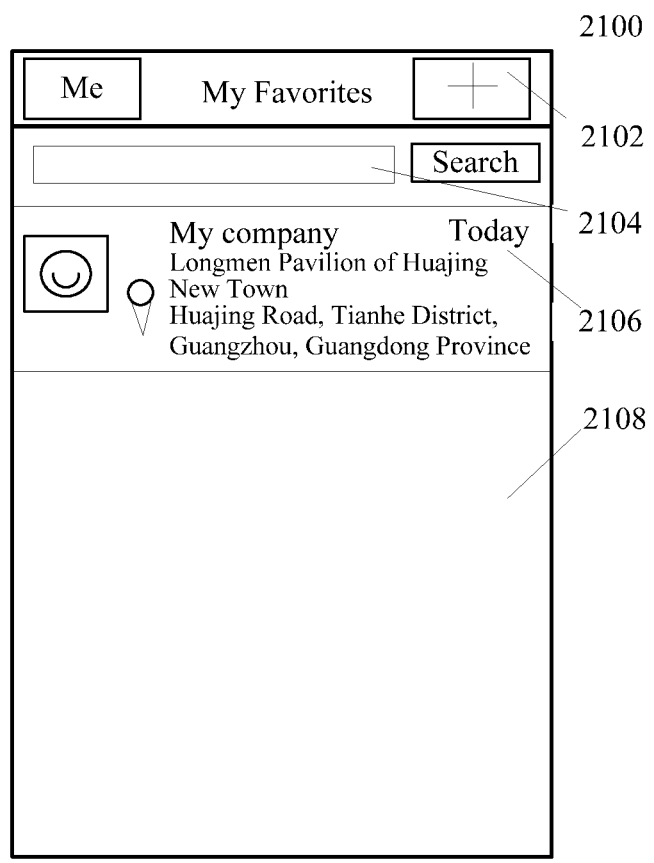
Figure 25:
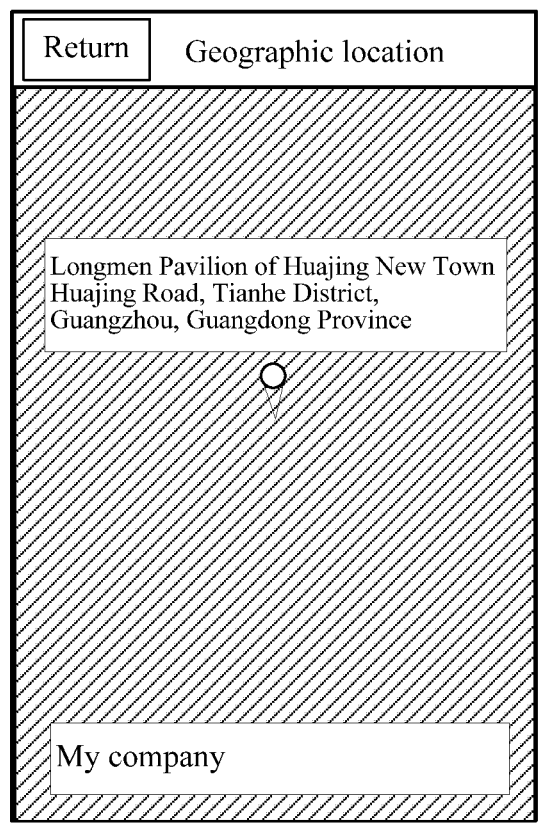

After the second location is bookmarked, the POI information of the second location may be displayed in the favorites list. FIG. 21 shows a favorites list interface 2100 before a remark is added. When a remark is not added, the favorites list may display a POI title and address information of the second location, and so on. After detecting a selection operation on the POI information of the second location, the terminal may display a map 2202 corresponding to the POI information of the second location, and as shown in FIG. 22, the POI title and address information of the second location, and so on may be displayed on the map. When the user clicks an input box 2204 in the interface 2200 displayed in FIG. 22, a remark adding interface 2000 may be displayed, and the user may input a remark, such as "my company," as remark information, as shown in FIG. 23. When the user clicks the finish option 2010, the process of adding the remark information may be finished. When the remark information is added, the favorites list interface 2100 may be as shown in FIG. 24. After the remark information is added, the favorites list may display the remark information, POI title, and address information of the second location, and so on. After detecting a selection operation on the POI information of the second location, the terminal may display a map corresponding to the POI information of the second location, and as shown in FIG. 25, the remark information, POI title, and address information of the second location, and so on may be displayed on the map.

Figure 26:
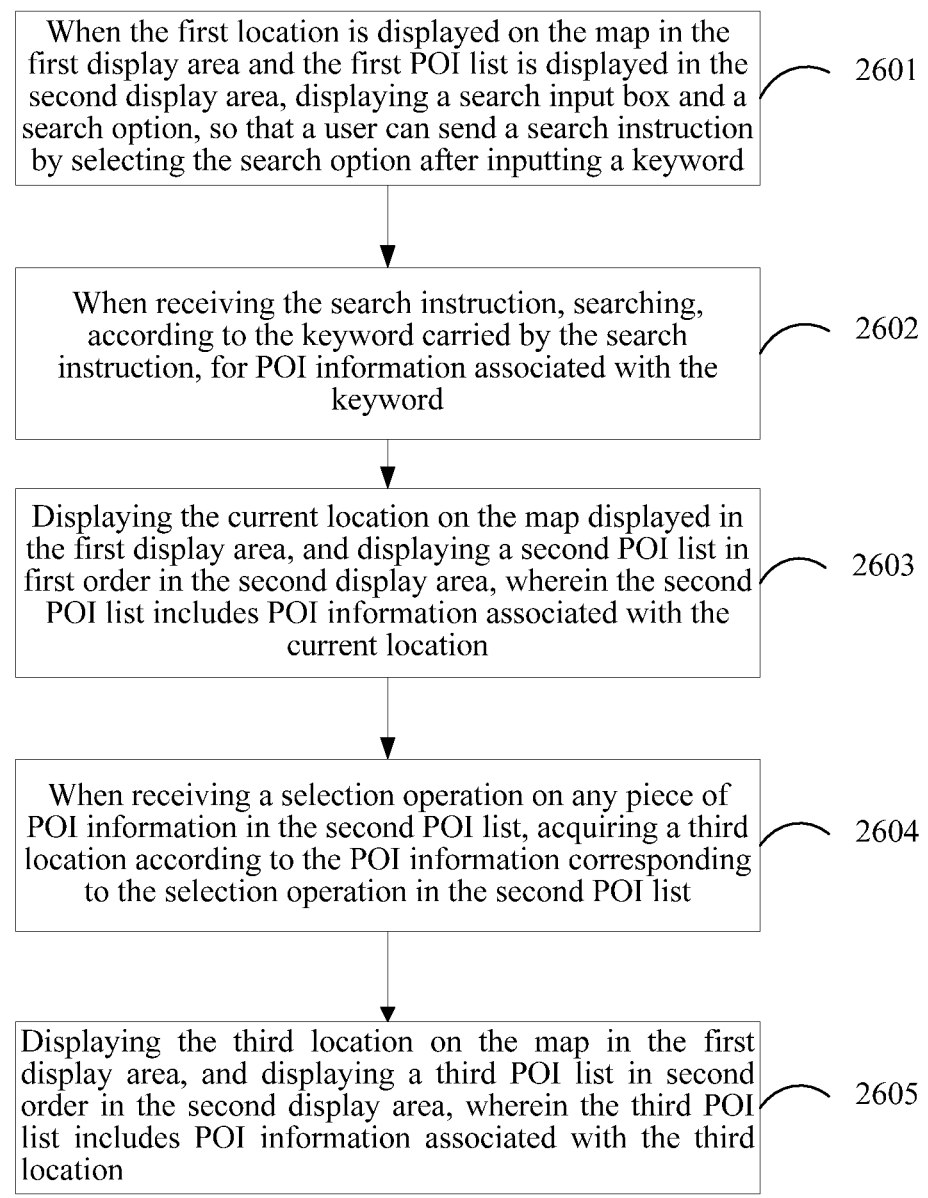
FIG. 26 is a flowchart of a method for displaying a geographic location provided by an example embodiment of the present disclosure.

FIG. 26 is a flowchart of another method for displaying a geographic location provided by an example embodiment of the present disclosure. The method may be stored in the memory unit 120 of the terminal 3500 as a set of program instructions. The program instructions may be executed by the processor 180 of the terminal 3500 in FIG. 35. The set of instructions may direct the processor 180 to perform the following steps of the method. In a scenario where the specified application is an instant messaging application and POI information can be searched for by using the instant messaging application. The method may include the following steps:

2601: When the first location is displayed on the map in the first display area and the first POI list is displayed in the second display area, displaying a search input box and a search option, so that a user may send a search instruction by selecting the search option after inputting a keyword.

The search instruction may carry the keyword input by the user.

Figure 27:
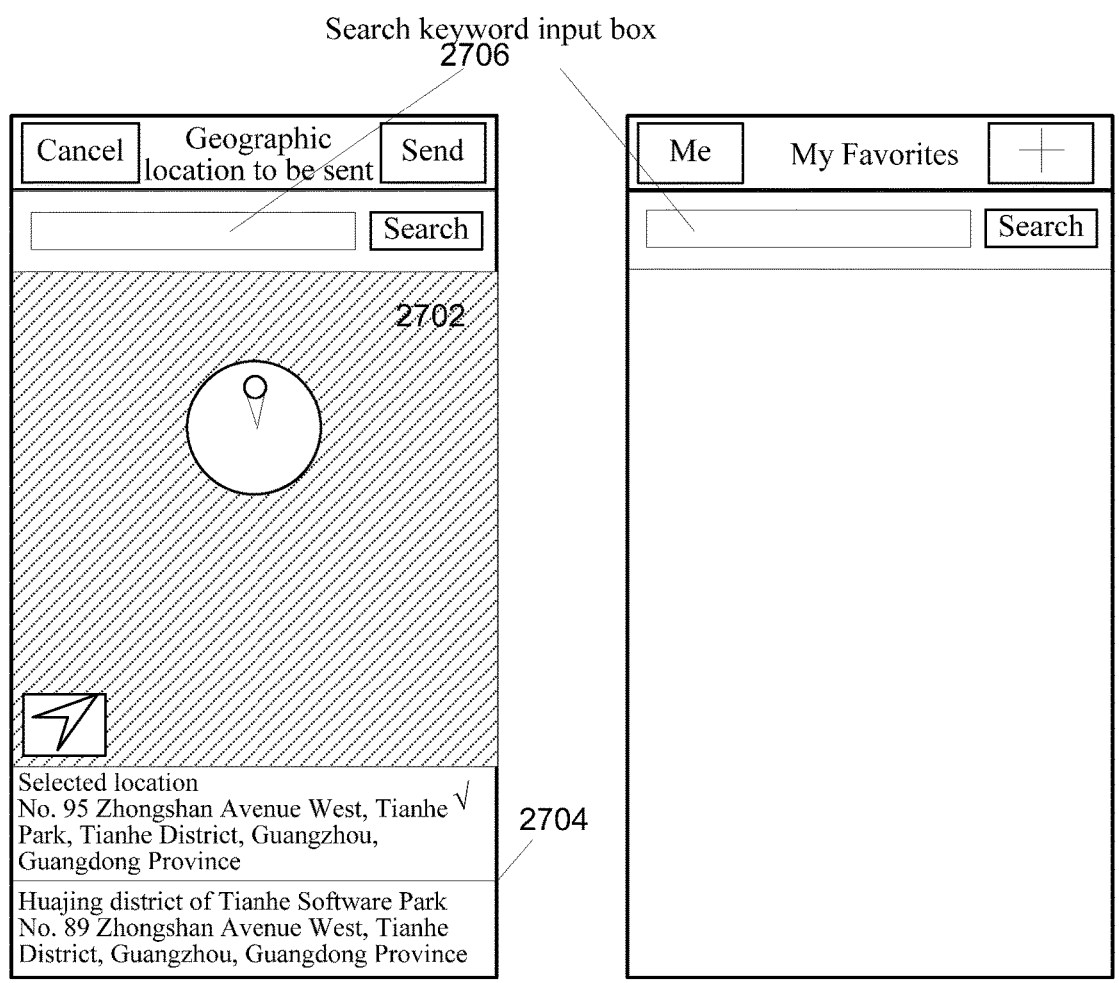
Figure 28:
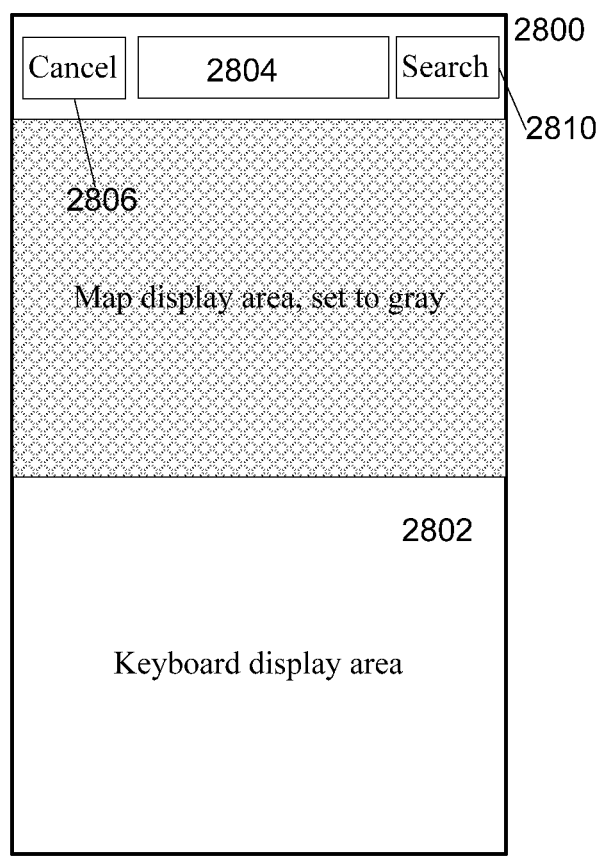

When the first location is displayed on the map in the first display area 2702 and the first POI list is displayed in the second display area 2704, the interface may include a search input box 2706 (as shown in FIG. 27). When detecting a selection operation on the search input box 2706, the terminal may display a keyword input interface 2800. As shown in FIG. 28, the keyword input interface 2800 may include an input box 2804, a cancel option 2806, a search option 2810, and so on. The user may input a keyword by using input devices such as a keyboard provided by the terminal, and click the search option after the input may be finished to send a search instruction.

2602: When detecting the search instruction, search, according to the keyword carried by the search instruction, for POI information associated with the keyword.

It should be noted that, during the search according to the keyword, the terminal may search for POI information in an area where the terminal is located. For example, if the terminal is currently in Beijing, only POI information in Beijing may be searched for, and during the search process, a loading effect (i.e., an animation showing that the terminal is loading data) may be displayed.

2603: Displaying, according to the current location, the current location on the map displayed in the first display area, and displaying a second POI list in first order in the second display area, wherein the second POI list may include POI information associated with the current location.

After finishing the search, the terminal may display the current location on the map in the first display area, and display the second POI list in first order in the second display area, as shown in FIG. 29. When the second POI list is displayed, POI information entries in the second POI list may be arranged from top down according to an ascending order of distances to the current location. When the POI information entry is displayed, a POI title and address information may also be displayed, like the first POI information entry 2901. Alternatively, when the POI information does not include corresponding address information, like the third POI information entry 2903, only a POI title may be displayed. Besides, the terminal may display only up to a fifth preset number of POI information entries in the second POI list, wherein the fifth preset number may be set by a technician when developing the program application, and/or may also be customized and/or adjusted by the user in using, which may be not limited by the example embodiment of the present disclosure.

In the interface displayed in FIG. 29, the fifth preset number is ten. Accordingly, ten POI information entries are displayed. The example embodiment of the present disclosure does not limit display content of entries in the POI list, a display order of the entries, and the number of displayed items.

Figure 30:
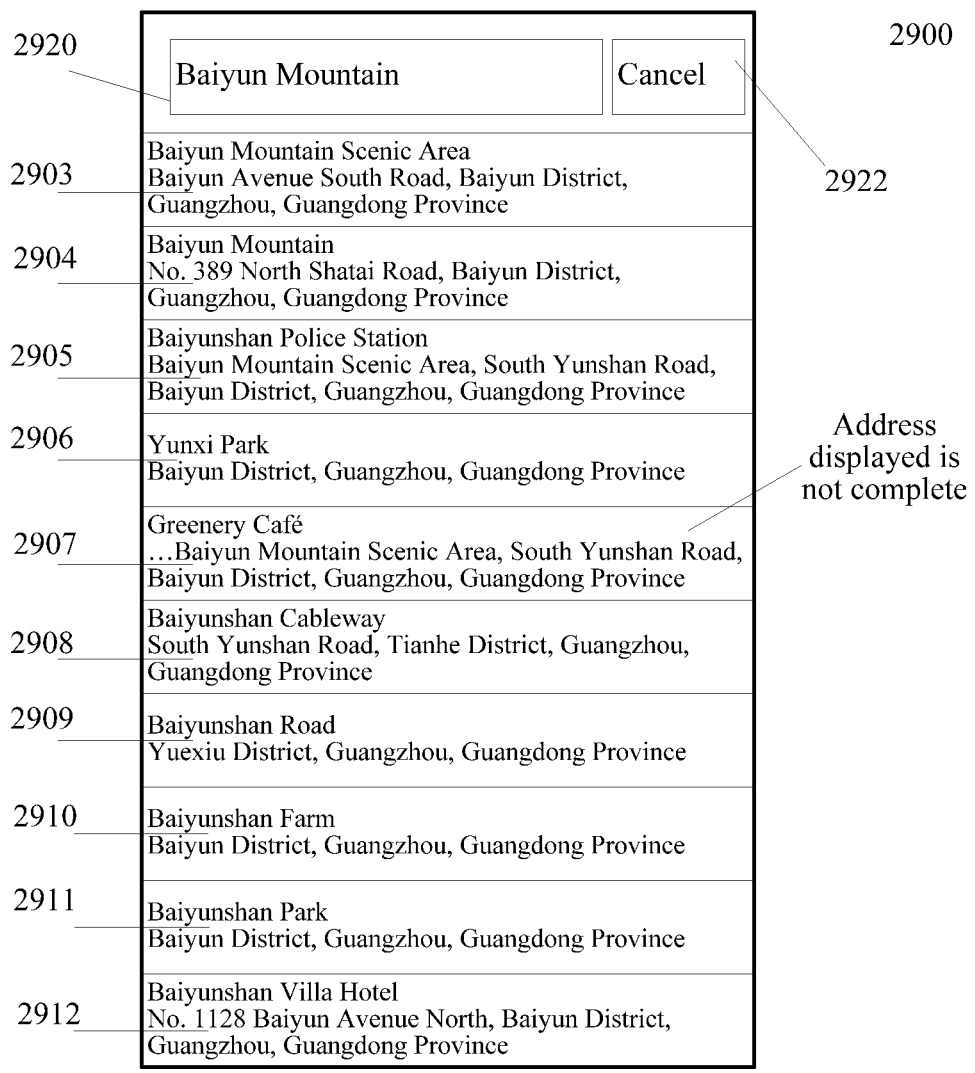

In addition, when the number of acquired POI information entries is less than the fifth preset number, only the acquired POI information entries may be displayed. When the number of acquired POI information entries is greater than the fifth preset number, the POI information selection interface may only display a fifth preset number of POI information entries. Further, when a slide operation on the POI list is detected, the terminal may scroll the POI list at the same speed along the same direction as the slide operation, so as to display more POI information entries. For example, when the fifth preset number is ten, if the terminal acquires seven pieces of POI information, the POI information selection interface may only display POI information entries corresponding to the seven pieces of POI information; if the terminal acquires 15 pieces of POI information, the POI information selection interface only displays POI information entries corresponding to the first ten pieces of POI information. When an upward slide operation of a distance of two POI information entries on the POI list is received, the terminal may scroll up two POI information entries at the same speed as the slide operation, and an updated POI information entries in the POI list corresponding to the third to twelfth pieces of POI information 2903-2912 may be displayed, as shown in FIG. 30.

Figure 31:
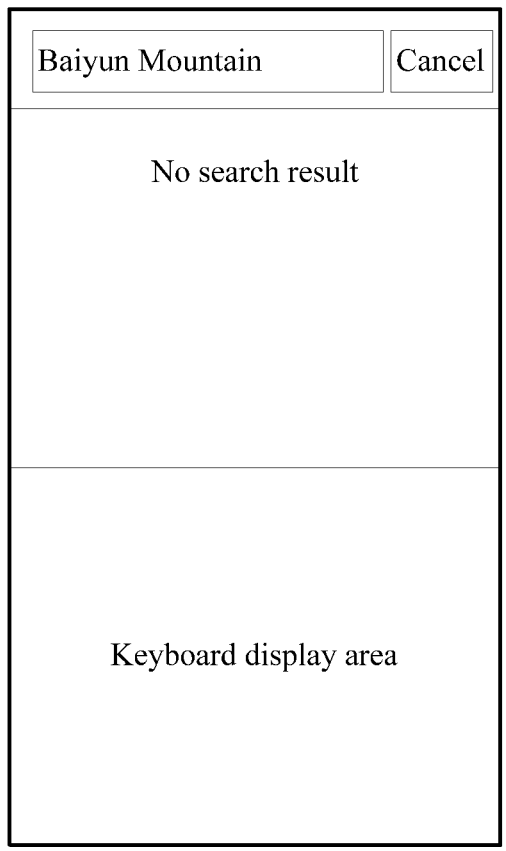

Step 2603 further may include: when the terminal does not find the POI information, including the keyword, displaying an interface that presents no search result, as shown in FIG. 31.

2604: When detecting a selection operation on any piece of POI information in the second POI list, acquiring a third location according to the POI information corresponding to the selection operation on the second POI list.

The third location may be a geographic location corresponding to the POI information that corresponds to the selection operation.

When the user needs to check a certain piece of POI information in the POI list, the user may click a POI information entry corresponding to the POI information to select the POI information entry; when receiving the selection operation on a certain piece of POI information entry, the terminal may determine, according to an area where the selection operation may be located, a geographic location corresponding to POI information in the POI information entry as a third location. For example, the user may clicks the third POI information entry 2903 in the POI list displayed in FIG. 29, and the terminal uses a location corresponding to the geographic address "Baiyun Avenue South Road, Baiyun District, Guangzhou, Guangdong Province" in the POI information of the POI information entry as the third location.

2605: Displaying the third location on the map in the first display area according to the third location, and displaying a third POI list in second order in the second display area, where the third POI list may include POI information associated with the third location.

Step 2605 is to Step 205, and thus is not described in detail here.

In the method provided by the present disclosure, POI information may be searched for by using a keyword, and a third location may be selected according to the found POI information, thereby displaying a third POI list of the third location, so that a user may select needed POI information from the list to perform positioning, hence implementing more precise and refined positioning. Even if the search keyword used by the user may be merely POI information near a search target, the true search target may still be positioned according to the POI information found at a preliminary stage, so that the search process may be more humanized.

Figure 32:
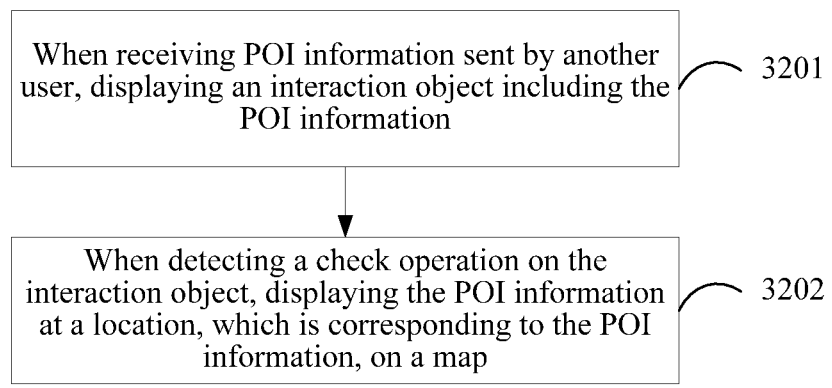
FIG. 32 is a flowchart of a method for displaying a geographic location provided by an example embodiment of the present disclosure.

The above example embodiments corresponding to FIG. 2, FIG. 16, and FIG. 26 are described by using examples where the terminal is a sender. FIG. 32 is a flowchart of another method for displaying a geographic location provided by an example embodiment of the present disclosure. The method may be stored in the memory unit 120 of the terminal 3500 as a set of program instructions. The program instructions may be executed by the processor 180 of the terminal 3500 in FIG. 35. The set of instructions may direct the processor 180 to perform the following steps of the method. In a scenario where the specified application may be an instant messaging application, and during interaction using the instant messaging application, a terminal, which serves as a receiver, receives POI information sent by another user and/or another terminal serving as a sender. The method may include the following steps:

3201: When receiving POI information sent by another user, displaying an interaction object including the POI information.

When receiving POI information sent by another user, the terminal may acquire an interaction object according to address information and/or a POI title in the received POI information, and a manner of displaying the interaction object may be the same as the manner of displaying the interaction object when the terminal is used as a receiver in Step 206.

It should be noted that the interaction object may be generated by a server and sent to the terminal over a network, and/or by the terminal itself locally, which is not limited by the example embodiment of the present disclosure.

3202: When detecting a check operation on the interaction object, displaying on a map the POI information at a location corresponding to the POI information.

When detecting a click operation on the interaction object, the terminal may determine that a check operation on the interaction object is received; then the terminal may display a map corresponding to the received POI information, and display, on the map, address information and/or a POI title in the POI information at a location corresponding to the POI information. A manner of displaying the map and the POI information may be similar to a manner in which the terminal displays POI information of the second location in Step 206.

In the method provided by the example embodiment of the present disclosure, the terminal may receive POI information sent by another user, and may accordingly display an interaction object including the POI information. When a click operation by the user on the interaction object is received, the terminal may display on the map the location of the POI information included in the interaction object, as well as the POI information itself, thereby making it convenient for the user to check map information.

Figure 33:
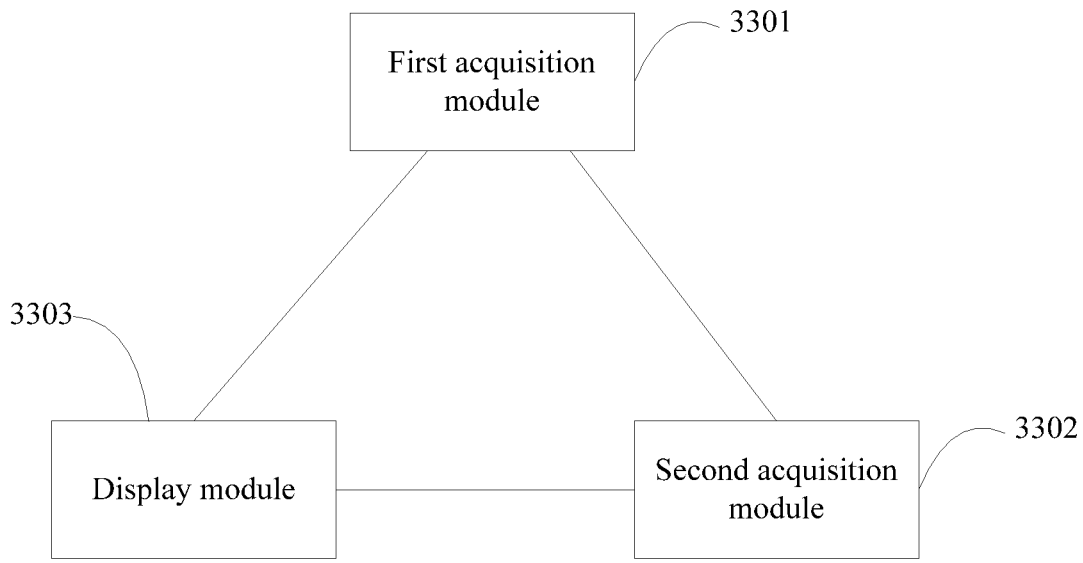
FIG. 33 is a schematic structural diagram of an apparatus for displaying a geographic location provided by an example embodiment of the present disclosure.

FIG. 33 is a schematic structural diagram of an apparatus for displaying a geographic location provided by an example embodiment of the present disclosure. The apparatus may include: a first acquisition module 3301, a second acquisition module 3302, and a display module 3303. The first acquisition module 3301 may be configured to, when detecting a positioning instruction, acquire a first location corresponding to the positioning instruction; the first acquisition module 3301 may be connected to the second acquisition module 3302, and the first acquisition module 3301 may be connected to the display module 3303; the second acquisition module 3302 may be configured to acquire POI information associated with the first location from a preset POI database according to the first location, wherein the preset POI database may store a correspondence between locations and POI information; the second acquisition module 3302 may be connected to the display module 3303, and the display module 3303 may be configured to display the first location on a map displayed in a first display area, and display a first POI list in first order in a second display area, wherein the first POI list may include the POI information associated with the first location.

Additionally, the first acquisition module 3301 may be further configured to, when detecting a selection operation on any piece of POI information in the first POI list, acquire a second location from POI information corresponding to the selection operation, wherein the second location may be a geographic location in the POI information corresponding to the selection operation. The display module 3303 may be further configured to display the second location on the map displayed in the first display area, and display the first POI list in second order in the second display area.

Figure 34:
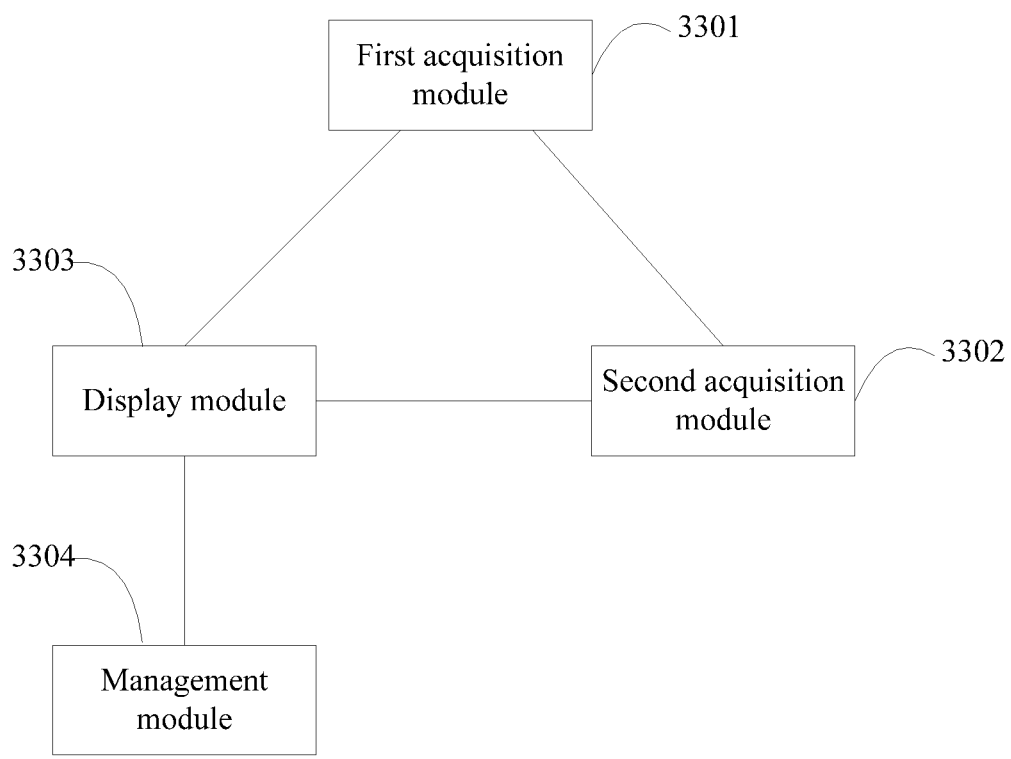
FIG. 34 is a schematic structural diagram of an apparatus for displaying a geographic location provided by an example embodiment of the present disclosure.

FIG. 34 is a schematic structural diagram of another apparatus for displaying a geographic location provided by an example embodiment of the present disclosure. In addition to the elements shown in FIG. 33, the apparatus in FIG. 34 may include: a management module 3304, wherein the management module 3304 may be connected to the display module 3303, and be configured to manage the POI information of the second location according to a management operation on the second location.

The management module 3304 may include: a bookmarking unit, configured to, when detecting a bookmarking operation on the second location, bookmark the POI information of the second location; a sending unit, configured to, when detecting a sending operation on the second location, send the POI information of the second location to a user specified by the sending operation, so that the user may check the second location according to an interactive object generated from the POI information of the second location, wherein the interactive object may be mapped to the second location; an editing unit, configured to, when detecting an editing operation on the second location, editing the POI information of the second location according to the editing operation, wherein the editing operation may include a remark information adding operation and/or renaming operation; a release unit, configured to, when detecting a release operation on the second location, release the POI information of the second location to a website and/or an application corresponding to the release operation; and a share operation, configured to, when detecting a share operation on the second location, store the POI information of the second location in a local storage area and/or server corresponding to the share operation, and allow a preset user corresponding to the share operation to check and modify the POI information of the second location.

The first acquisition module 3301 may be further configured to, when detecting a positioning instruction, acquire a current location of the terminal, and use the current location as the first location; and/or, when detecting a dragging operation on the map displayed in the first display area, determine that a positioning instruction is received, load a map according to a movement track of the dragging operation, and use a central location of the map displayed at the end of the dragging operation as the first location.

The dragging operation may be a slide operation on the map displayed in the first display area; and/or a dragging operation by a mouse on the map displayed in the first display area; and/or, a click operation and a positioning operation on a direction control key when the first display area may be selected; and/or, a click operation on a direction option in the first display area; and/or a click operation on a direction option in a third display area.

The POI information associated with the first location may include: POI information associated with a distance to the first location less than a preset threshold; and/or POI information having same keyword information as the first location.

The POI information having same keyword information as the first location may include: POI information having same street information as the first location; and/or, POI information having same community information as the first location; and/or, POI information having a same place name as the first location.

The display module 3303 may be further configured to, when the first location is displayed on the map in the first display area and the first POI list may be displayed in the second display area, display a search input box and a search option, so that after inputting a keyword, a user may send a search instruction by selecting the search option; the second acquisition module 3302 may be further configured to, when detecting the search instruction, search, according to the keyword carried by the search instruction, for POI information associated with the keyword; the display module 3303 may be further configured to display the current location on the map in the first display area according to the current location, and display a second POI list in first order in the second display area, wherein the second POI list may include POI information associated with the current location.

The first acquisition module 3301 may be further configured to, when detecting a selection operation on any piece of POI information in the second POI list, acquire a third location according to the POI information corresponding to the selection operation on the second POI list; the display module 3303 may be further configured to display the third location on the map in the first display area according to the third location, and display a third POI list in second order in the second display area, wherein the third POI list may include POI information associated with the third location.

The bookmarking unit may be further configured to display the POI information of the second location in a favorites list.

The display module 3303 may be further configured to, when receiving POI information sent by another user, display an interaction object including the POI information, and when detecting a check operation on the interaction object, display on the map the POI information at a location corresponding to the POI information.

The display module 3303 may be further configured to, when displaying the POI information, if a distance between a terminal and the location corresponding to the POI information may be less than a preset threshold, display a current location of the terminal on the map.

The display module 3303 may be further configured to when receiving POI information sent by another user, display an interaction object including address information and/or a POI title in the POI information.

The display module 3303 may be further configured to display address information and/or a POI title in the POI information.

The first order may be an ascending order of distances to the first location.

The second order may be an order in which a POI information entry corresponding to the second location is used as a first item, and starting from a second item, other entries in the first POI list except the POI information entry corresponding to the second location are displayed in first order.

It should be noted that, when the apparatuses for displaying a geographic location provided by the foregoing example embodiment display a geographic location, the division of the foregoing functional modules may be merely an example for description. In actual applications, the foregoing functions may be distributed to and completed by different functional modules as required, that is, an internal structure of a device may be divided into different functional modules to complete all or a part of functions described above. In addition, the apparatus for displaying a geographic location provided by the foregoing example embodiment and the example embodiment of the method for displaying a geographic location belong to the same conception.

Referring back to FIG. 35. According to an example embodiment the programs stored in the memory unit 120 may be configured to be executed by the processor 180 and direct the processor 180 to perform the following operations: when detecting a positioning instruction, acquiring a first location corresponding to the positioning instruction; acquiring POI information associated with the first location from a preset POI database according to the first location, wherein the preset POI database stores a correspondence between locations and POI information; displaying the first location on a map displayed in a first display area; and displaying a first POI list in first order in a second display area, wherein the first POI list may include the POI information associated with the first location.

The program stored in the memory may further include instructions to direct the processor to execute the following operations: when detecting a selection operation on any piece of POI information in the first POI list, acquiring a second location from the POI information corresponding to the selection operation, wherein the second location may be a geographic location of the POI information corresponding to the selection operation; displaying the second location on the map displayed in the first display area; and displaying the first POI list in second order in the second display area.

The program stored in the memory may further include instructions to direct the processor to execute the following operations: managing POI information of the second location according to a management operation on the second location.

The program stored in the memory may further include instructions to direct the processor to execute the following operations: when detecting a bookmarking operation on the second location, bookmarking the POI information of the second location; or when detecting a sending operation on the second location, sending the POI information of the second location to a user specified by the sending operation, so that the user may check the second location according to an interactive object generated from the POI information of the second location, wherein the interactive object may be mapped to the second location; or, when detecting an editing operation on the second location, editing the POI information of the second location according to the editing operation, wherein the editing operation may include a remark information adding operation and/or renaming operation; or when detecting a release operation on the second location, releasing the POI information of the second location to a website and/or an application corresponding to the release operation; or, when detecting a share operation on the second location, storing the POI information of the second location in a local storage area and/or server corresponding to the share operation, and allowing a preset user corresponding to the share operation to check and modify the POI information of the second location.

The program stored in the memory may further include instructions to direct the processor to execute the following operations: when detecting a positioning instruction, acquiring a current location of the terminal, and using the current location as the first location; or, when detecting a dragging operation on the map displayed in the first display area, determining that a positioning instruction may be detected, loading a map according to a movement track of the dragging operation, and using a central location of the map displayed at the end of the dragging operation as the first location.

The program stored in the memory may further include instructions to direct the processor to execute the following operations: the dragging operation may be a slide operation on the map displayed in the first display area; a dragging operation by a mouse on the map displayed in the first display area; a click operation and a positioning operation on a direction control key when the first display area may be selected; a click operation on a direction option in the first display area; and/or a click operation on a direction option in a third display area.

The POI information associated with the first location may include: POI information with a distance to the first location less than a preset threshold; and/or POI information having same keyword information as the first location.

The POI information having same keyword information as the first location may include: POI information having same street information as the first location; POI information having same community information as the first location; and/or POI information having a same place name as the first location.

The program stored in the memory may further include instructions to direct the processor to execute the following operations: when the first location is displayed on the map in the first display area and the first POI list is displayed in the second display area, displaying a search input box and a search option, so that after inputting a keyword, a user may send a search instruction by selecting the search option; when detecting the search instruction, searching, according to the keyword carried by the search instruction, for POI information associated with the keyword; according to the current location, displaying the current location on the map in the first display area; and displaying a second POI list in first order in the second display area, where the second POI list may include POI information associated with the current location.

The program stored in the memory may further include instructions to direct the processor to execute the following operations: when detecting a selection operation on any piece of POI information in the second POI list, acquiring a third location according to the POI information corresponding to the selection operation on the second POI list; displaying the third location on the map displayed in the first display area according to the third location; and displaying a third POI list in second order in the second display area, wherein the third POI list may include POI information associated with the third location.

The program stored in the memory may further include instructions to direct the processor to execute the following operations: displaying the POI information of the second location in a favorites list.

The program stored in the memory may further include instructions to direct the processor to execute the following operations: when receiving POI information sent by another user, displaying an interaction object including the POI information; and when detecting a check operation on the interaction object, displaying on the map the POI information at a location corresponding to the POI information.

The program stored in the memory may further include instructions to direct the processor to execute the following operations: when displaying the POI information, if a distance between a terminal and the location corresponding to the POI information may be less than a preset threshold, displaying a current location of the terminal on the map.

The program stored in the memory may further include instructions to direct the processor to execute the following operations: when receiving POI information sent by another user, displaying an interaction object address information and/or a POI title in the POI information.

The program stored in the memory may further include instructions to direct the processor to execute the following operations: displaying the address information and/or POI title in the POI information.

The program stored in the memory may further include instructions to direct the processor to execute the following operations: the first order may be an ascending order of distances to the first location.

The program stored in the memory may further include instructions to direct the processor to execute the following operations: the second order may be an order in which a POI information entry corresponding to the second location may be used as a first item, and starting from a second item, other entries in the first POI list except the POI information entry corresponding to the second location may be displayed in first order.

A person of ordinary skill in the art may understand that all or a part of the steps of the foregoing example embodiments may be implemented through hardware, or may be implemented by a program instructing relevant hardware. The program may be stored in a computer readable non-transitory storage medium. For example, the storage medium may be a read-only memory, a magnetic disk, or an optical disc.

The invention claimed is:

1. A computer-implemented method for displaying a geographic location, comprising:
    providing a terminal device to a user, the terminal device including a processor and a screen; and
    operating, by the processor, an instant communication application installed in the terminal device, and under the instant communication application:
        receiving a positioning instruction on a session interface of the instant communication application, the session interface configured to display messages sent and received with the instant communication application,
        displaying a map interface of the instant communication application on a first display area of the screen in response to the positioning instruction;
        acquiring, by the processor, a first location in response to the positioning instruction;
        acquiring, by the processor, information of at least one point of interest (POI) associated with the first location;
        displaying, by the processor, the first location on the map interface displayed in the first display area on the screen; and
    displaying, by the processor, a first POI list in a second display area on the screen, wherein the first POI list includes at least one entry being displayed in a first order, each entry including information of a POI (POI information).

2. The method according to claim 1, further comprising, under the instant communication application:
    when receiving a selection operation on an entry in the first POI list, acquiring, by the processor, a second location corresponding to a selected entry;
    displaying the second location on the map interface displayed in the first display area in response to the selection operation on the entry; and
    displaying the first POI list in a second order in the second display area in response to the selection operation on the entry.

3. The method according to claim 2, wherein in the first order the at least one entry is listed based on a distance of the first location to a POI corresponding to the at least one entry; and in the second order the selected entry is a first entry in the first POI list and a remaining entry of the at least one entry is listed based on the distance of the first location to a POI corresponding to the remaining entry.

4. The method according to claim 2, further comprising, under the instant communication application, when receiving an editing operation on the second location, editing, by the processor, POI information of the second location, wherein the editing operation includes at least one of a remark adding operation or a renaming operation; and when receiving a release operation on the second location, releasing, by the processor, the POI information of the second location to at least one of a website or an application configured to run on the terminal device.

5. The method according to claim 1, wherein the acquiring of the first location comprises:

when receiving a dragging operation on the map interface displayed in the first display area, updating the map interface according to a movement track of the dragging operation, and selecting a central location of the map interface displayed at an end of the dragging operation as the first location.

6. The method according to claim 1, wherein POI information associated with the first location comprises at least one of:

POI information with a distance to the first location less than a preset threshold; or POI information having same keyword information as the first location, wherein the POI information having the same keyword information as the first location comprises at least one of:

POI information having same street information as the first location;

POI information having same community information as the first location; or

POI information having a same place name as the first location.

7. The method according to claim 1, further comprising, under the instant communication application:

displaying, by the processor on the screen, a search input box and a search option configured to allow the user to input a keyword in the search input box and send a search instruction to the processor by selecting the search option;

when receiving the search instruction, searching, by the processor, for POI information associated with the keyword;

displaying, by the processor, a current location of the terminal device on the map interface in the first display area; and displaying a second POI list in the second display area, wherein the second POI list includes the POI information associated with the current location.

8. The method according to claim 7, further comprising, under the instant communication application:

when receiving a selection operation on a POI information in the second POI list, acquiring, by the processor, a third location according to selected POI information on the second POI list;

displaying, by the processor, the third location on the map interface; and displaying, by the processor, a third POI list in the second display area, wherein the third POI list comprises POI information associated with the third location.

9. The method according to claim 1, further comprising, under the instant communication application:

when receiving a message including POI information sent from another terminal device, displaying an interactive object on a session interface of the instant communication application, the session interface configured to display messages sent and received under the instant communication application the interaction object based on received POI information, wherein the interaction object comprises at least one of address information or a POI title in the received POI information; and when receiving a check operation on the interaction object, displaying, by the processor on the map interface, the received POI information at a location corresponding to the received POI information.

10. The method according to claim 9, further comprising, under the instant communication application:

when displaying the received POI information and when a distance between a current location of the terminal device and the location corresponding to the received POI information is less than a preset threshold, displaying the current location of the terminal device on the map interface.

11. An apparatus, comprising:

a processor-readable non-transitory storage medium storing a set of instructions; and a processor in communication with the processor-readable non-transitory storage medium, configured to execute the set of instructions to:

operate an instant communication application installed in the apparatus, and within the instant communication application, the set of instructions further executable by the processor to:

receive a message directed to the instant communication application, the message including location information;

display, on a screen, an interactive object on a session interface of the instant communication application in response to the message, the session interface configured to display messages sent and received with the instant communication application, the interactive object including the location information and responsive to user interaction;

display a map within the instant communication application on a first display area of the screen in response to a selection operation on the interactive object;

acquire a first location based on the location information of the interactive object;

acquire information of at least one point of interest (POI) associated with the first location;

display the first location on a map displayed in the first display area on the screen; and display a first POI list in a second display area on the screen, wherein the first POI list includes at least one entry being displayed in a first order, each entry including POI information of a POI.

12. The apparatus according to claim 11, wherein within the instant communication application the processor is further configured to execute the set of instructions to:

when receiving a selection operation on an entry in the first POI list, acquire a second location corresponding to a selected entry;

display the second location on the map displayed in the first display area; and display the first POI list in a second order in the second display area.

13. The apparatus according to claim 12, wherein in the first order the at least one entry is listed based on a distance of the first location to a POI corresponding to the at least one entry to the first location; and
in the second order the selected entry is a first entry in the first POI list and a remaining entry of the at least one entry is listed based on the distance of the first location to a POI corresponding to the remaining entry.

14. The apparatus according to claim 12, wherein within the instant communication application the processor is further configured to execute the set of instructions to:
send, in response to receipt of a send operation on the second location, the POI information of the second location to a receiver specified by the sending operation, wherein the POI information of the second location is configured to generate an interactive object mapped to the second location on the receiver, and the receiver is associated with a contact saved in the instant communication application.

15. The apparatus according to claim 11, wherein to acquire the first location the processor is further configured to execute the set of instructions to conduct at least one of:
acquisition of a current location apparatus as the first location; or
in response to receipt of a dragging operation on the map displayed in the first display area, update a map according to a movement track of the dragging operation, and select a central location of the map displayed at an end of the dragging operation as the first location.

16. The apparatus according to claim 11, wherein POI information associated with the first location comprises at least one of:
POI information with a distance to the first location less than a preset threshold; or
POI information having same keyword information as the first location,
wherein the POI information having the same keyword information as the first location comprises at least one of:
POI information having same street information as the first location;
POI information having same community information as the first location; or
POI information having a same place name as the first location.

17. The apparatus according to claim 11, wherein within the instant communication application the processor is further configured to execute the set of instructions to:
display on the screen a search input box and a search option configured to allow a user to input a keyword in the search input box and send a search instruction to the processor by selecting the search option;
when receiving the search instruction, search for POI information associated with the keyword;
display a current location on the map in the first display area; display a second POI list in the second display area, wherein the second POI list includes the POI information associated with the current location.

18. The apparatus according to claim 17, wherein within the instant communication application the processor is further configured to execute the set of instructions to:
in response to receipt of a selection operation on a POI information in the second POI list, acquire a third location according to selected POI information on the second POI list;
display the third location on the map; and
display a third POI list in the second display area, wherein the third POI list comprises POI information associated with the third location.

19. The apparatus according to claim 11, wherein within the instant communication application the processor is further configured to execute the set of instructions to:
display the first location and in response to a distance between a current location of the apparatus and the first location being less than a preset threshold, display the current location of the apparatus on the map.

20. The apparatus according to claim 12, wherein within the instant communication application the processor is further configured to execute the set of instructions to:
store, in response to a sharing operation on the second location, the POI information of the second location in at least one of a local storage area or a server, and permit a receiver specified by the sharing operation to check and modify the POI information of the second location.

* * * * *